United States Patent [19]

Ninomiya et al.

[11] Patent Number: 5,422,691

[45] Date of Patent: Jun. 6, 1995

[54] PROJECTION TYPE DISPLAYING APPARATUS AND ILLUMINATION SYSTEM

[75] Inventors: Noboru Ninomiya; Junichiro Shinozaki; Masaki Ishikawa; Akihito Tanimoto, all of Suwa, Japan

[73] Assignee: Seiko Epson Corporation, Tokyo, Japan

[21] Appl. No.: 949,243

[22] PCT Filed: Mar. 13, 1991

[86] PCT No.: PCT/JP92/00307

§ 371 Date: Nov. 13, 1992

§ 102(e) Date: Nov. 13, 1992

[87] PCT Pub. No.: WO92/16871

PCT Pub. Date: Oct. 1, 1992

[30] Foreign Application Priority Data

| Mar. 15, 1991 | [JP] | Japan | 3-051251 |
| Jul. 10, 1991 | [JP] | Japan | 3-169646 |
| Jul. 24, 1991 | [JP] | Japan | 3-184649 |
| Sep. 12, 1991 | [JP] | Japan | 3-233395 |
| Oct. 28, 1991 | [JP] | Japan | 3-281500 |
| Feb. 21, 1992 | [JP] | Japan | 4-035231 |

[51] Int. Cl.$^6$ ............................................ G03B 21/14
[52] U.S. Cl. ............................................ 353/69; 353/70; 353/77; 362/308
[58] Field of Search ............ 353/70, 69, 38, 98, 353/99, 100, 37, 102; 359/454, 455, 456, 457; 362/260, 309, 308, 307, 299, 326, 328

[56] References Cited

U.S. PATENT DOCUMENTS

| 2,469,080 | 5/1949 | Rosin et al. | 353/102 |
| 3,253,505 | 5/1966 | Miller | 353/70 |
| 4,089,599 | 5/1978 | Kuboshima | 353/70 |
| 4,436,392 | 3/1984 | Vanderwerf | 353/70 |
| 4,674,836 | 6/1987 | Yata et al. | 359/457 |
| 4,964,718 | 10/1990 | Van Hoogstrate et al. | 353/31 |
| 4,971,436 | 11/1990 | Aoki et al. | 353/98 |
| 5,032,022 | 7/1991 | Sato et al. | 353/70 |
| 5,098,184 | 3/1992 | van den Brandt et al. | 353/38 |

FOREIGN PATENT DOCUMENTS

| 51-334 | 1/1976 | Japan . |
| 53-147835 | 11/1978 | Japan . |
| 63-120242 | 8/1988 | Japan . |
| 2-236587 | 9/1990 | Japan . |

*Primary Examiner*—William A. Cuchlinski, Jr.
*Assistant Examiner*—William C. Dowling
*Attorney, Agent, or Firm*—Ladas & Parry

[57] ABSTRACT

To provide an oblique projection type displaying apparatus for radiating rays of light which are nearly parallel with a light bulb, thereby preventing the brightness of a resultant image from becoming uneven, the apparatus comprises a light source, optical modulating means, projecting means for projecting an image generated by the optical modulating means on a screen, and the screen, wherein a center optical axis of rays of light projected by the projecting means are obliquely entered into the screen, wherein the projecting means comprises first projecting optical means for converting an image generated by the optical modulating means into an intermediate image with trapezoidal distortion, and second projecting optical means for converting the intermediate image with trapezoidal distortion into an image without trapezoidal distortion on the screen, and wherein the first projecting optical means comprises two lenses which are not parallel each other. In addition, the constructions of the light source, the reflection mirror for changing the optical path, and the screen are modified.

22 Claims, 40 Drawing Sheets

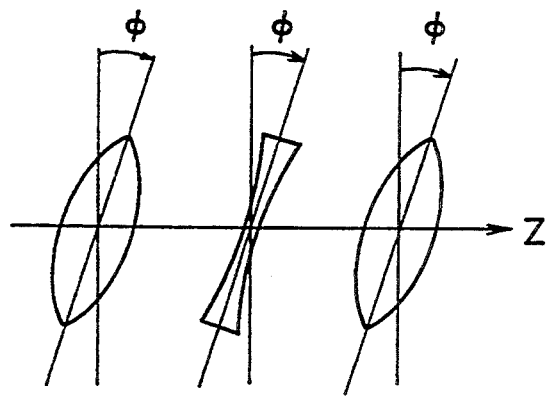
F I G. 10
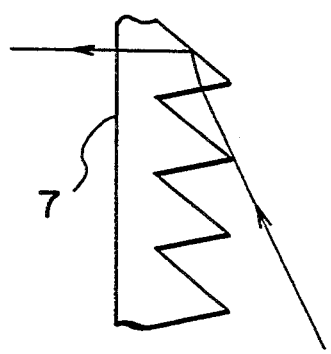
F I G. 11

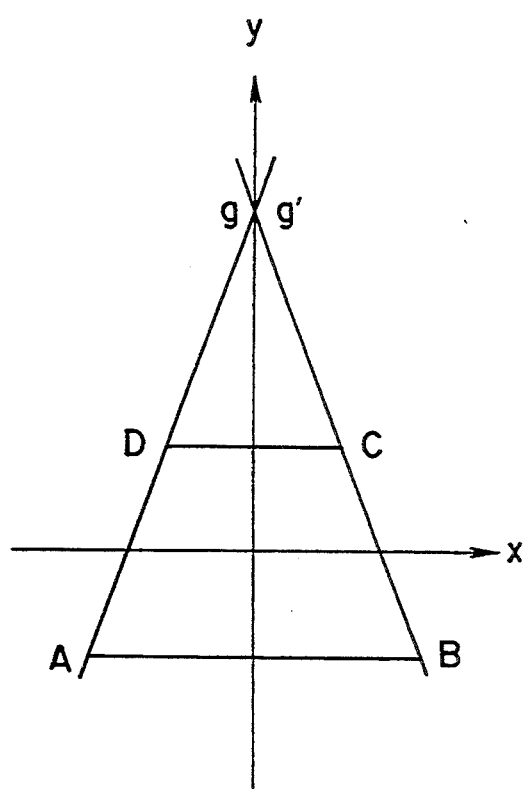
F I G. 15

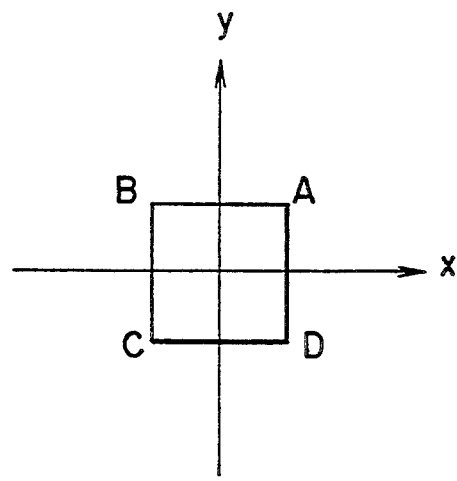
F I G. 17
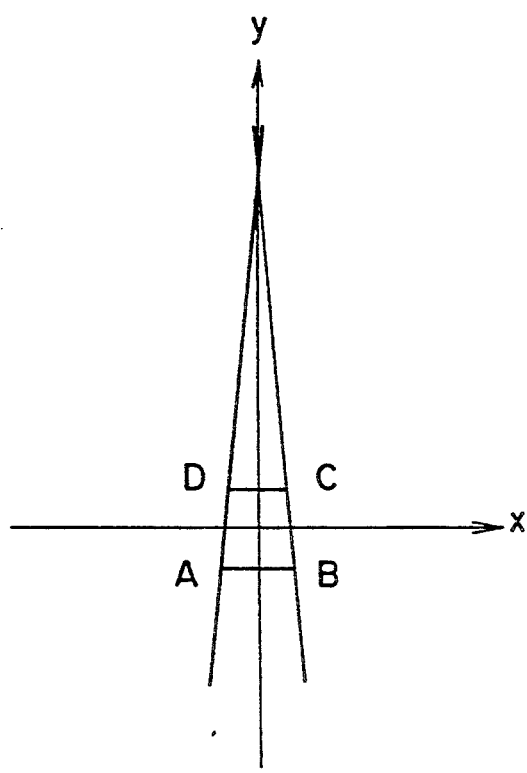
F I G. 18

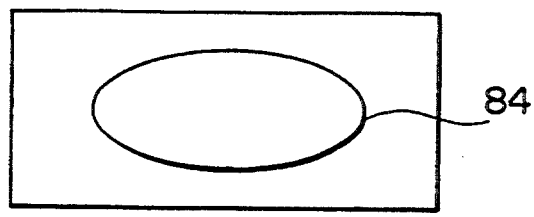
F I G. 23 (A)
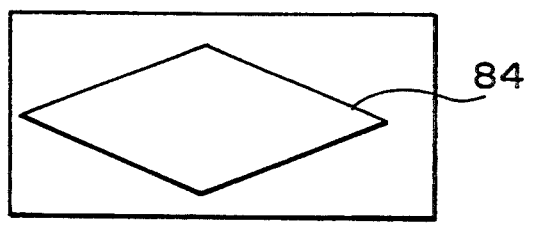
F I G. 23 (B)
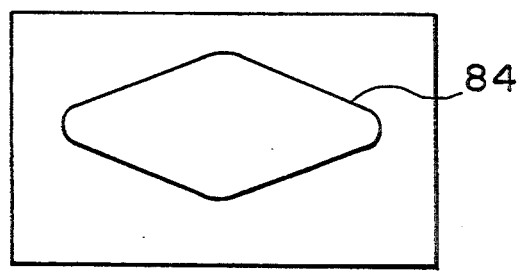
F I G. 23 (C)

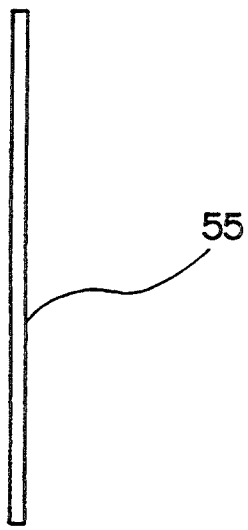
F I G. 42
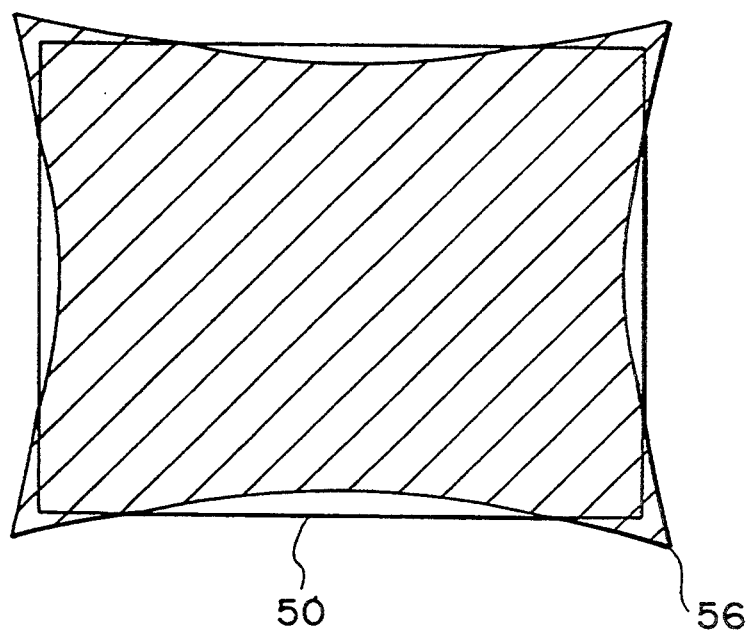
F I G. 43

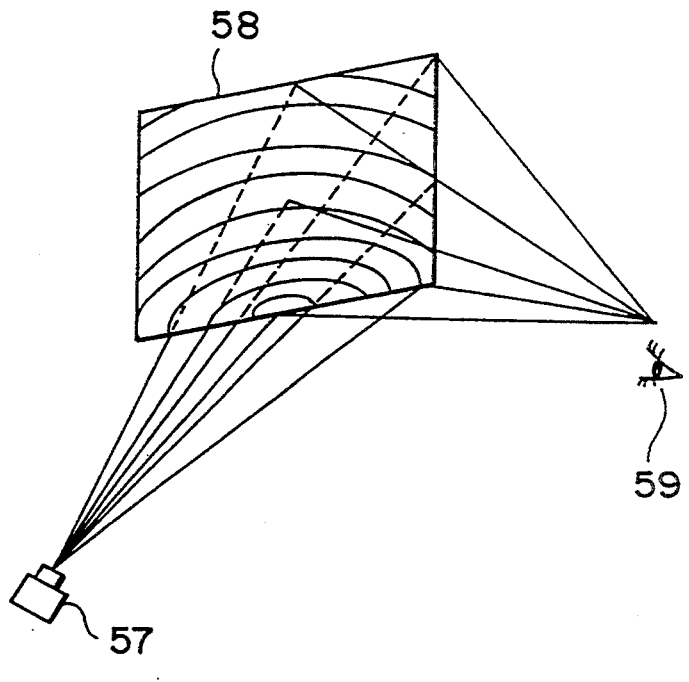
F I G. 50(A)
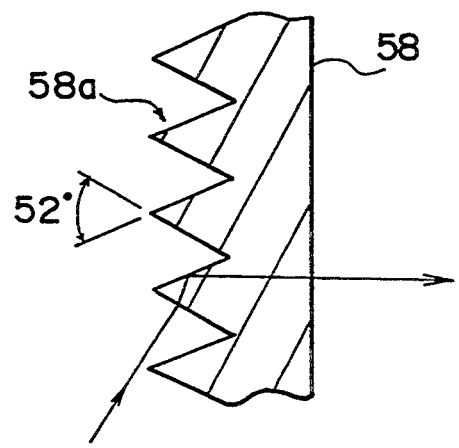
F I G. 50(B)

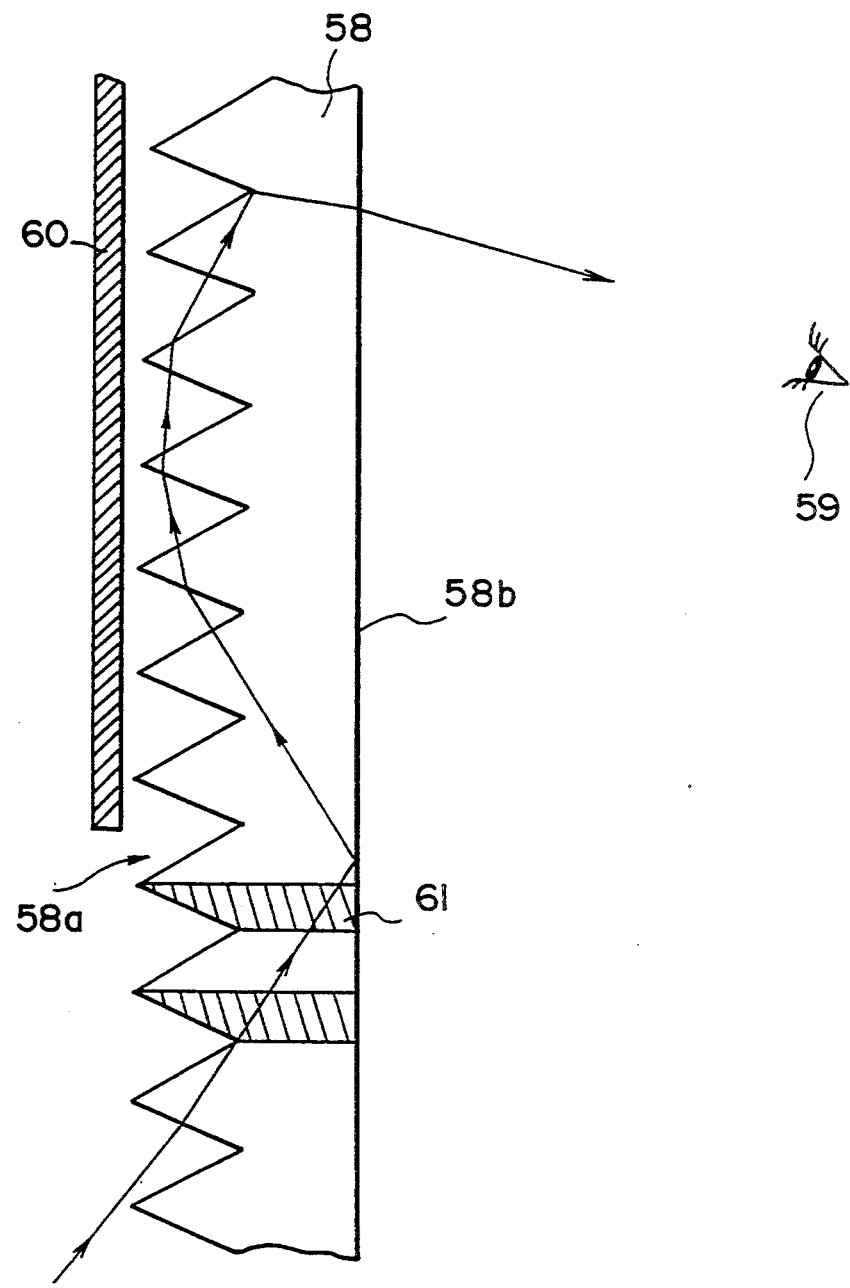
F I G. 51

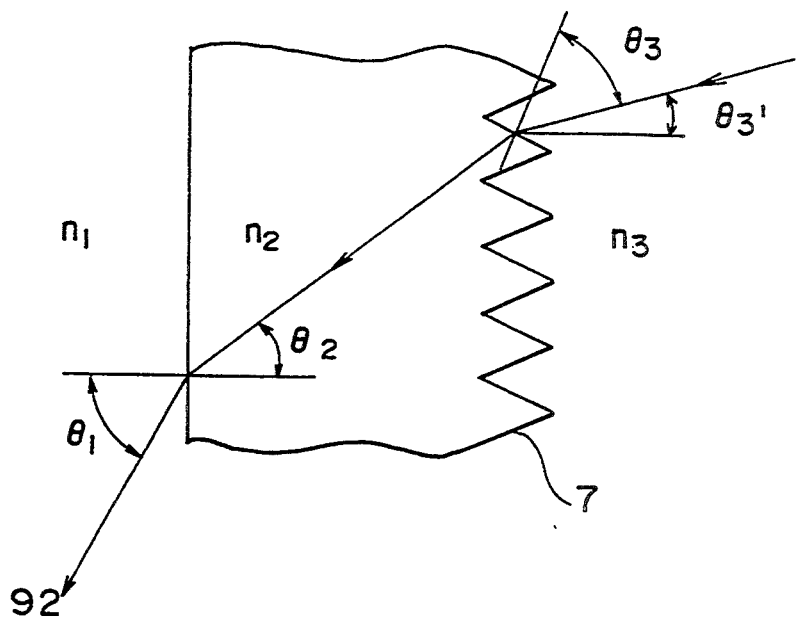
F I G. 54
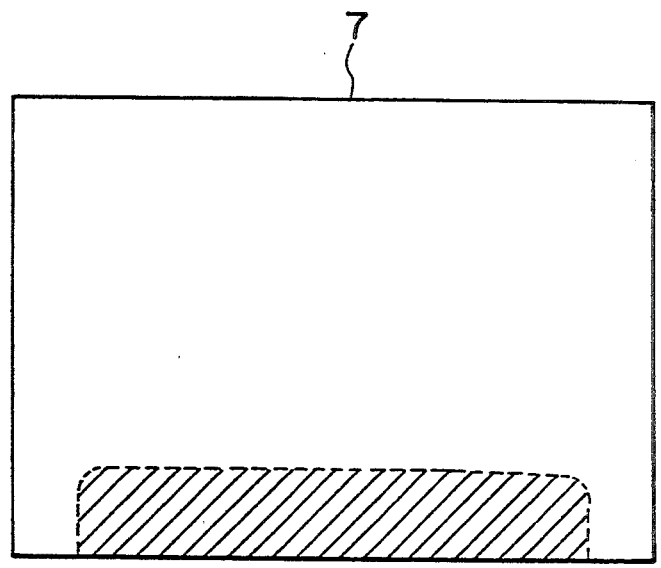
F I G. 55

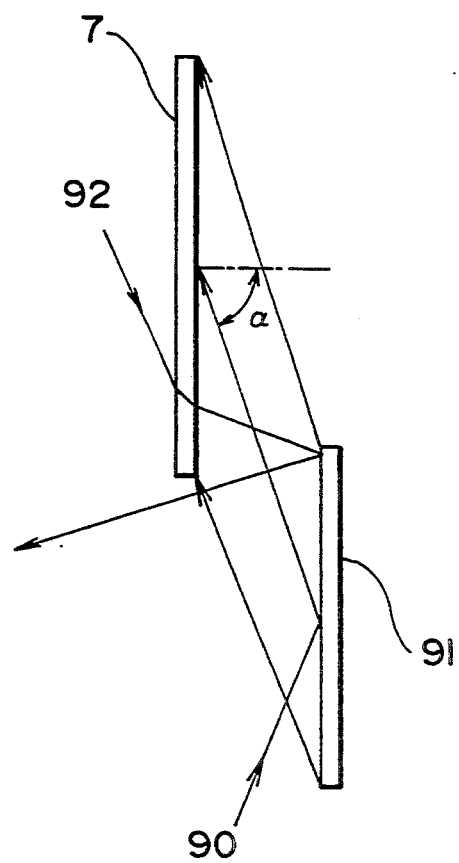
F I G. 56

PROJECTION TYPE DISPLAYING APPARATUS AND ILLUMINATION SYSTEM

TECHNICAL FIELD

The present invention relates to a projection type displaying apparatus for displaying video images, computer images, and so forth, in particular, relates to a projection type displaying apparatus for obliquely projecting these images from the rear of a screen with a liquid crystal light bulb or the like.

RELATED ART

Recently, an enlarging and projecting technique which uses a displaying device having a transmitting or reflecting type dot matrix liquid crystal (hereinafter this device is referred to as a light bulb) and which enlarges and projects an image of the light bulb on a screen is gaining popularity. This is because the image displayed by a Braun tube (CRT) has a limitation of the image size. To display a large image, the size of the Braun tube should be proportionally increased. The practical limitation of the image size of the Braun tube is at most 40 inches. Thus, to accomplish the need of such a large image, the enlarging and projecting technique is being used.

On the other hand, to provide a large light bulb, it should be produced without defects. However, it is not easy to produce a large light bulb which is free of defects. Even if such a light bulb were produced, it would become very expensive.

By using a transmitting (or reflecting type) light bulb, an image thereof can be enlarged and projected impressively without the restriction of the screen size.

From the above-mentioned point of view, a display type displaying apparatus which is equipped with an in-cabinet optical system which enlarges an image of a light bulb and projects the enlarged image from the rear of a screen disposed in front of the cabinet has been provided. The user can see the enlarged image from the front of the cabinet of the apparatus.

In a conventional rear projection type displaying apparatus using such a light bulb, as disclosed in Japanese Utility Patent Laid-Open Publication Serial No. HEI 1-85778, rays of light are radiated from a light source to a transmitting type liquid crystal light bulb. An image displayed on the liquid crystal light bulb is enlarged by a projection lens. The optical path of the resultant light is changed by a reflection mirror so as to guide it to the rear of a screen. In this construction, the entire projection optical system can be housed in a cabinet. Thus, the apparatus becomes portable. Moreover, even in a well-illuminated room, the user can see images on the screen.

However, in the conventional display type rear projection displaying apparatus, the optical path of rays of light which are transmitted through the light bulb is changed by the reflection mirror. The resultant rays of light are guided to the rear of the screen. Thus, unless the rays of light are projected in such a way that the optical axis thereof is perpendicular to the screen, the resultant image has a distortion such as a trapezoidal distortion. Therefore, this distortion largely restricts installation conditions of the reflection mirror. In other words, the volume of the projection optical system, in particular, the depth between the projection optical system and the screen (thickness of the cabinet) increase. Thus, the cabinet of the rear projection type displaying apparatus cannot become thin.

As a means for solving the above-mentioned problem, an oblique projection technique is known. As disclosed in U.S. Ser. No. 751,347 to T. Scheimpflug, when an image of an oblique object passes through a lens, a trapezoidal distortion takes place in the resultant image. As shown in FIG. 13, an image of an oblique object plane 43 passes through a lens 44. Thus, the resultant image is formed on an oblique image plane by the lens 44 in such a way that the prolonged line of the object plane 43 intersects with the prolonged line of the lens 44. Now, the point of intersection of the perpendicular line of the image side focal point f of the lens 44 and the prolonged line of the image plane 45 is referred to as g. A square image ABCD on the object plane 43 shown in FIG. 14 passes through the lens 44. Thus, an image ABCD with a trapezoidal distortion shown in FIG. 15 is formed on the image plane 45 by the lens 44.

To remove the trapezoidal distortion, as shown in FIG. 16, a light bulb 46, a first projection lens 47, a second projection lens 49, and a screen 50 are inclined to the axis Z by degrees $\phi 1$, $\phi 2$, $\phi 3$, and $\phi 4$, respectively. In this construction, the line of intersection g of the plane which passes through the image side focal point f1 of the first projection lens 47 and which is in parallel therewith and the image plane 48 which has a trapezoidal distortion is matched with the line of intersection g' of the plane which passes through the object side focal point f2 of the second projection lens 49 and which is in parallel therewith and the image plane 48 with the trapezoidal distortion.

At this point, for example an image on the light bulb 46 of a square ABCD shown in FIG. 17 passes through the first projection lens 47. Thus, an image ABCD with a trapezoidal distortion as shown in FIG. 18 is formed by the first projection lens 47. However, by the second projection lens 49, an image ABCD without a trapezoidal distortion as shown in FIG. 19 is formed on the screen 50. Therefore, when this projection optical system is housed in a cabinet 38 in such a way that rays of light are reflected by a first mirror 40 and a second mirror 41, a thin rear projection type displaying apparatus can be constructed. In the figure, reference numeral 39 is a projection optical unit.

However, in the above-mentioned projection type optical system, to remove the trapezoidal distortion, the focal distance of the first projection lens 47 shown in FIG. 16 becomes short, thereby decreasing the aperture size thereof. Thus, as shown in FIG. 20, the light bulb 46 should be illuminated by rays of light which are radiated from the light source 51 and collected by a condenser lens 52. At this point, as shown in FIG. 20, an incident angle $\theta 1$ of rays of light at an upper portion of the light bulb 46 differs from an incident angle $\theta 2$ of rays of light at a lower portion thereof. In other words, the transmittance of rays of light of the light bulb 46 varies depending on the incident angle thereof. Consequently, the brightness of the image on the screen 50 becomes uneven.

On the other hand, a conventional lighting unit for use in such a projection type displaying apparatus is composed of a lamp 53 and a reflector 54, as shown in a sectional view in FIG. 30. Rays of light radiated from the lamp 53 are reflected by the reflector 54. Thus, rays of light H are obtained. With these rays of light H as a light source, an image is projected on a screen.

However, in the above-mentioned related art, the rays of light H do not contain rays of light reflected from a center portion F of the reflector 54. Thus, as shown in FIG. 31, the amount of rays of light H at the center portion is low. In other words, the center portion of an enlarged image projected on the screen becomes dark.

In addition, since rays of light K emitted radially from the edge of the reflector 54 are lost, all the rays cannot be effectively used.

There is another conventional rear projection type displaying apparatus using such a light bulb, which is disclosed in Japanese Patent Laid-Open Publication Ser. No. HEI 3-051251. In this apparatus, an image displayed on the light bulb is illuminated by rays of light of a light source. The resultant rays of light are enlarged and projected by a projection lens. The optical path of the rays of light is changed by a reflection mirror. The resultant rays of light are guided obliquely from the rear of a screen. In this construction, the reflection mirror is a plane reflection mirror 55 shown in FIG. 42.

However, due to the presence of the plane reflection mirror 55, a projection lens and an image 55 cause an image 56 on a screen 50 to have a distortion as shown in FIG. 43. Alternatively, a required magnification of the image may not be obtained.

As a conventional transmitting type screen, a construction shown in FIG. 50 is also known. FIG. 50 (a) is a perspective view of this transmitting type screen. FIG. 50 (b) is a sectional view of the screen. An optical image projected from a video projector 57 is collected by a fine-prism array 58a disposed in the rear of a transmitting type screen 58 to the front thereof. The vertical angle of each prism of the fine-prism array 58a is set to 52°. An optical image collected to the front of the transmitting type screen 58 reaches eyes 59 of the user. Thus, the user can recognize the optical image projected from the video projector 57.

However, in the above-mentioned transmitting type screen 58, a light leakage and a ghost take place. In other words, depending on the angle of rays of light which enter the prism array 58a, a part of the rays of light which reaches the eyes 59 of the user leaks out of the transmitting type screen 58. Thus, the image projected onto the transmitting type screen 58 becomes dark. Therefore, the user has difficulty in seeing the image.

It is said that a ghost takes place in the following mechanism. Now, assume a situation where a light insulating sheet 60 is placed on the light incident plane side of a transmitting type screen 58. On the light incident plane side of the light insulating sheet 60, the above-mentioned prism array 58a is disposed. Rays of light which enter in the direction of an arrow in the figure are totally reflected on an exit plane 58b of the screen 58. The resultant rays of light are refracted by the prism array in the rear of the light shielding sheet 60. Thus, the rays of light are bent. The resultant rays of light reach the eyes 59 of the user through the exit plane 58b. As a result, the user can brightly see the portion which should be dark due to the presence of the black light insulating sheet 60 disposed on the light incident plane. More specifically, the portion which should be black looks reddish and bright. Thus, this portion becomes very substantial. It is presumed that the rays of red color tend to least bend due to the wave-length dependability of refraction.

As a countermeasure for preventing such a ghost phenomenon, black stripes 61 shown with hatched lines of the figure are disposed on the transmitting type screen 58. With these black stripes 61, optical paths from which the light leakage takes place can be blocked. By such a countermeasure, the occurrence of the ghost can be suppressed. However, the ghost cannot be completely prevented. In addition, placing the black stripes 61 on the screen 58 is laborious.

SUMMARY OF THE INVENTION

Therefore, an object of the present invention is to provide an oblique projection type displaying apparatus comprising a light bulb which is illuminated by parallel rays of light having a nearly constant incident angle which does not vary on the light bulb, thereby projecting an image with a constant contrast on a screen.

Another object of the present invention is to provide a projection type displaying apparatus comprising a lighting unit which is adapted to nearly equalize the distribution of parallel rays of light which are radiated from a lamp as a light source and then reflected by a reflector, thereby obtaining an image with nearly equal brightness.

A further object of the present invention is to provide a displaying apparatus comprising an optical system having at least one reflection mirror which is partially or entirely non-plane, thereby compensating a distortion of an image on a screen and changing the magnification of the image.

A further other object of the present invention is to provide a displaying apparatus comprising a transmitting type screen which is free of light leakage so that the user can observe a high quality image.

The present invention provides a projection type displaying apparatus which comprises a light source, optical modulating means, projecting means for projecting an image generated by the optical modulating means on a screen, wherein a center optical axis of rays of light projected by the projecting means are obliquely strike the screen, wherein the projecting means comprises first projecting optical means for converting an image generated by the optical modulating means into an intermediate image with trapezoidal distortion, and second projecting optical means for converting the intermediate image with trapezoidal distortion into an image without trapezoidal distortion on the screen, and wherein the first projecting optical means comprises two lenses which are not parallel to each other.

In addition, an aperture stop mechanism is disposed in the projection optical system.

Moreover, in a space on the light exit side of a reflector for reflecting rays of light radiated from a lamp, at a limited portion in the center of at least one surface, a light transmitting type optical device having a concave surface or a convex surface is disposed. Alternatively, to use rays of light which are radiated outwardly from an edge of the reflector, an optical device with a thin wall is disposed at a limited portion in the periphery thereof. The apparatus of the present invention further comprises a lighting unit having a cylindrical cone shape optical device.

Moreover, the apparatus of the present invention comprises a light source, optical modulating means, projecting means for projecting an image generated by the optical modulating means on a screen, a reflection mirror for causing rays of light reflected by the projecting means to strike a screen, wherein a center optical axis of rays of light projected by the projecting means obliquely contact the screen, and wherein the reflection mirror comprises a plurality of reflection mirror elements, at least one reflection mirror element being not plane. Furthermore, the apparatus of the present invention comprises a transmitting type screen including a fine prism array, the prism array being adapted for collecting an optical image transmitted from a rear surface of the screen at an incident angle to a front side thereof, wherein the vertical angle of each prism of the fine prism array is set to an angle in the range from 40° to 50°. Alternatively, the center optical axis of rays of light has an incident angle of 60° or more to the screen.

BRIEF DESCRIPTION OF DRAWINGS

FIG. 10 is a sectional view showing the construction of an embodiment of lenses in accordance with the present invention;

FIG. 11 is a partial enlarged view showing a cross section of a screen having prisms in accordance with the present invention, rays of light being totally reflected in the prisms;

FIG. 15 is a schematic diagram describing an image formed on an image plane of FIG. 13;

FIG. 17 is a schematic diagram describing a light bulb of FIG. 16;

FIG. 18 is a schematic diagram describing an image plane with a trapezoidal distortion of FIG. 16;

FIGS. 23 (A) to (C) are schematic diagrams describing examples of shapes of aperture stop mechanisms;

FIG. 42 is a sectional view showing a last reflection mirror in accordance with a related art;

FIG. 43 is a schematic diagram showing an image formed on a screen of FIG. 42;

FIGS. 50 (A) and (B) are schematic diagrams showing a conventional transmitting type screen;

FIG. 51 is a schematic diagram describing the mechanism of how a ghost takes place;

FIG. 54 is a schematic diagram showing how outer light reflected by a last reflection mirror is transmitted through a screen;

FIG. 55 is a schematic diagram describing a screen of a related art; and

FIG. 56 is a sectional view showing the construction of an embodiment of a reflection mirror in accordance with the present invention.

DETAILED DESCRIPTION OF BEST MODES FOR CARRYING OUT THE INVENTION

With reference to the accompanying drawings, the present invention will be described in detail.

Figure 1:
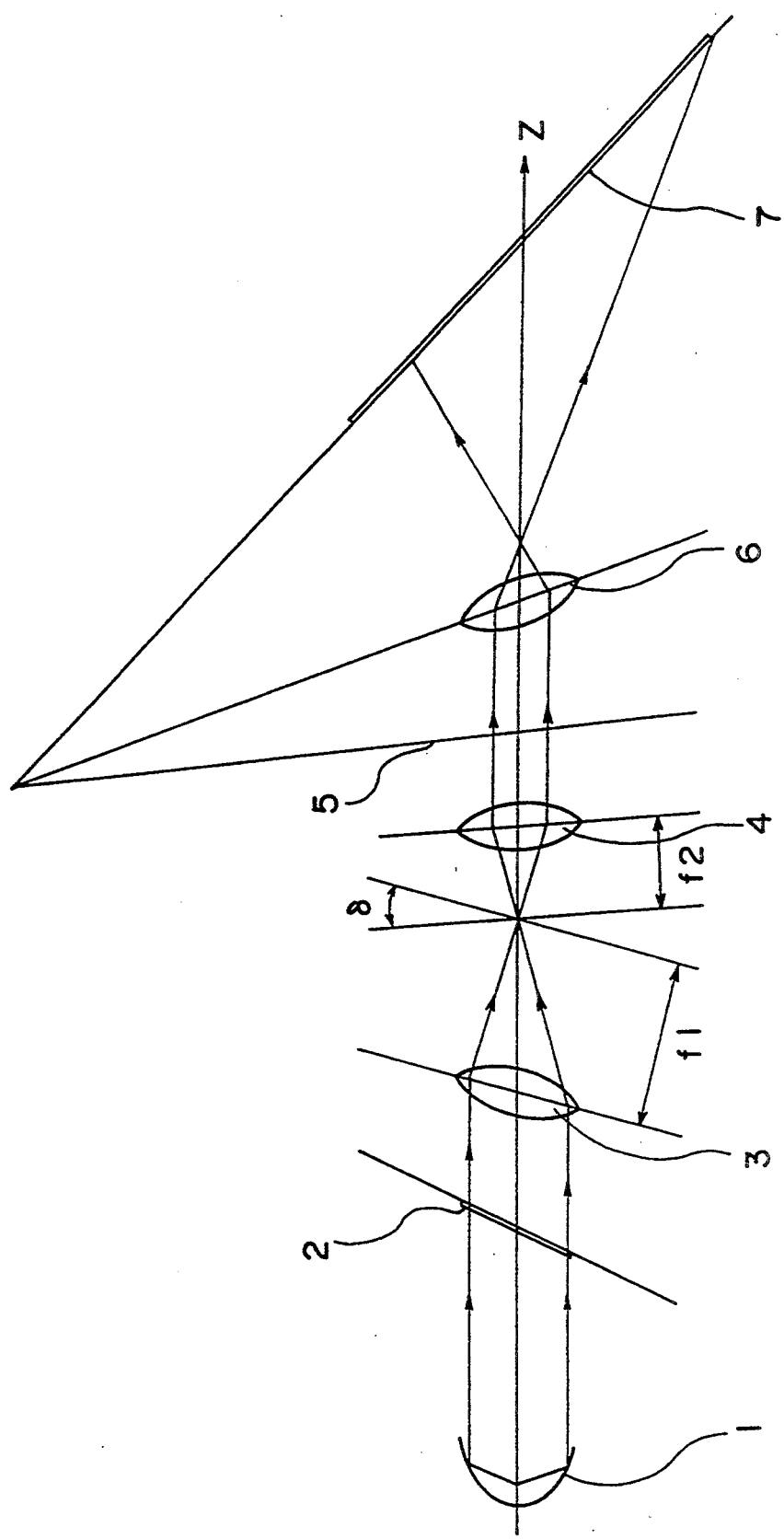
FIG. 1 is a schematic diagram showing the construction of an oblique projection type optical system in accordance with the present invention.
Figure 2:
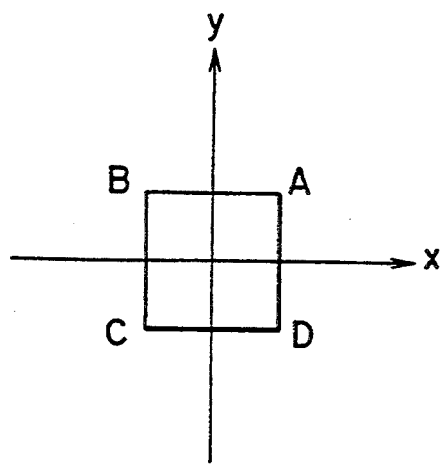
FIG. 2 is a schematic diagram describing a light bulb of FIG. 1.
Figure 3:
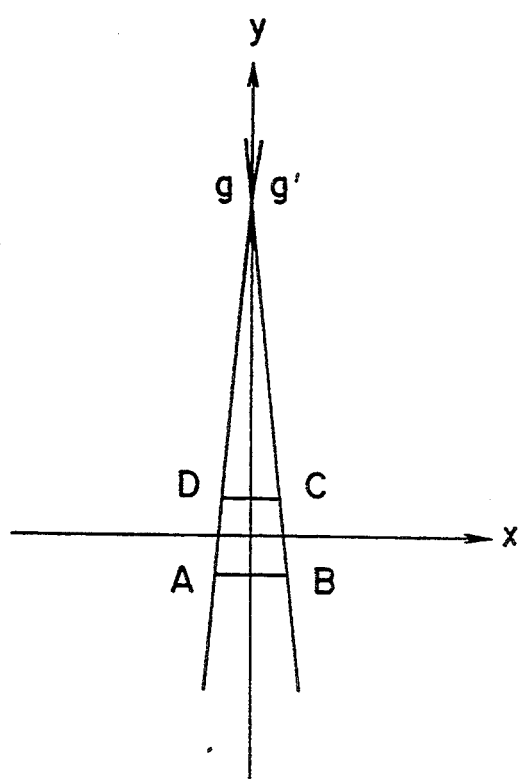
FIG. 3 is a schematic diagram describing an intermediate image of FIG. 1.
Figure 4:
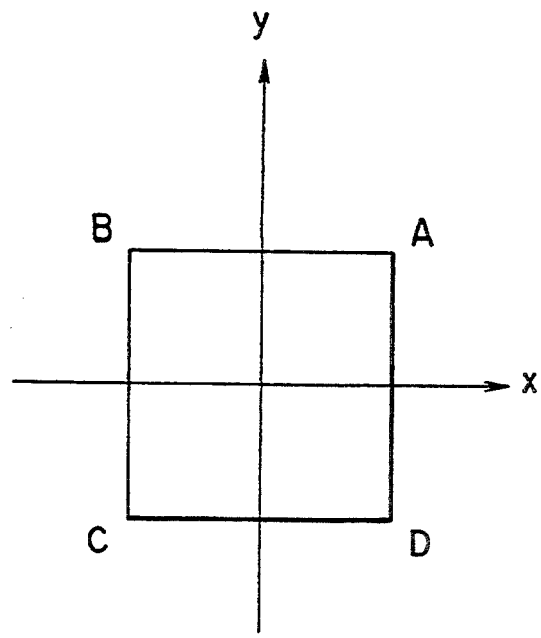
FIG. 4 is a schematic diagram describing an image formed on a screen of FIG. 1.

FIG. 1 shows the construction of an embodiment of an oblique projection type optical system in accordance with the present invention. FIG. 2 shows an image on a light bulb. FIG. 3 shows an intermediate image with a trapezoidal distortion. FIG. 4 shows an image without a trapezoidal distortion, the image being formed on a screen.

In FIG. 1, the optical axis of a first lens 3 of a first projection optical system, the optical axis of a second lens 4 thereof, the optical axis of a second projection optical system 6, the normal of a light bulb 2, and the normal of a screen 7 are disposed on the same plane.

In FIG. 1, a light source 1 is a xenon lamp with a parabolic reflection mirror or a metal halide lamp therewith. The light bulb 2 has a construction where grid-shaped electrodes are disposed on a liquid crystal so as to control the transmittance of each picture element.

The first lens 3 of the first projection optical system and the second lens 4 thereof are inclined by $\delta$ each other. The first lens 3 and the second lens 4 are disposed in such a way that the line of intersection of the image side focal plane of the first lens and the object side focal plane of the second lens 4 nearly passes through the axis Z. In addition, an intermediate image plane 5, the second projection optical system 6, and the screen 7 are disposed in such a way that their prolonged planes intersect on the same line.

Figure 5:
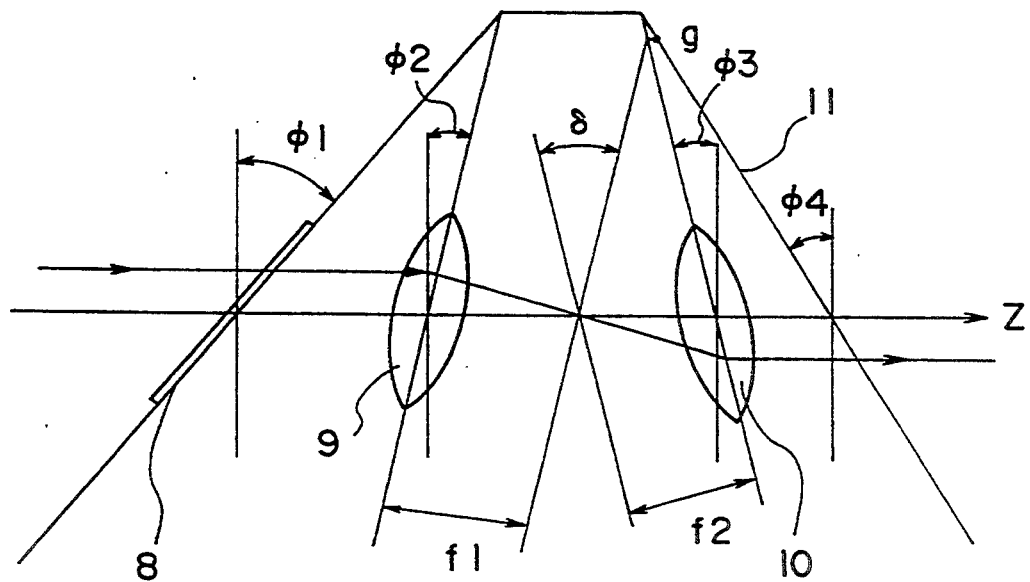
FIG. 5 is a schematic diagram showing the construction of an embodiment of a first projection optical system in accordance with the present invention, the first projection optical system being constructed of positive lenses.

Rays of light which are radiated from the light source 1 reach and illuminate the light bulb 2 almost in parallel. Thus, since the rays of light are entered into the light bulb 2 with nearly the same incident angle, the brightness and contrast of the light bulb 2 do not vary on the entire surface thereof. An image on the light bulb 2 passes through the first lens 3 and the second lens 4 which are inclined to each other. Thus, an intermediate image with a trapezoidal distortion is formed on the intermediate image plane 5. As shown in FIG. 5, the line of intersection of a plane in parallel with the axis Z and an intermediate image plane 11 which contains the line of intersection of the image side focal plane of the first lens 9 and the principal plane of the second lens 10 is referred to as g. When the line of intersection g is matched with the line of intersection g' of a plane in parallel with the second projection optical system 6 and the intermediate image plane 5 which passes through the object side focal point of the second projection optical system 6 (as shown in FIG. 3), an intermediate image ABCD with a trapezoidal distortion passes through the second projection optical system 6. Thus, an image ABCD without a trapezoidal distortion as shown in FIG. 4 is formed on the screen 7.

The first lens 3 of the first projection optical system and the second lens 4 thereof shown in FIG. 1 can be constructed of a combination lens having an inclination of angle $\phi$ so as to compensate aberration.

The screen 7 can be a rear screen which is used for a rear projection type television set or the like. This screen comprises a resin base containing a diffusing agent, a sheet of a lenticular lens, and a sheet of a Fresnel lens so as to have a high luminous intensity distribution characteristic. However, in the present invention, since rays of light are obliquely projected, it is preferable to use a screen with a high luminous intensity distribution characteristic for the oblique projection. As shown in FIG. 11, this screen is constructed by combining a sheet which uses the phenomenon of total reflection of prisms along with the sheet of lenticular lens. Thereby, incident rays of light are oriented in the direction nearly perpendicular to the front surface of the screen 7 so as to prevent rays of light projected on the screen 7 from being transmitted to the prolonged direction thereof. The practical construction of this screen will be described later.

Figure 12:
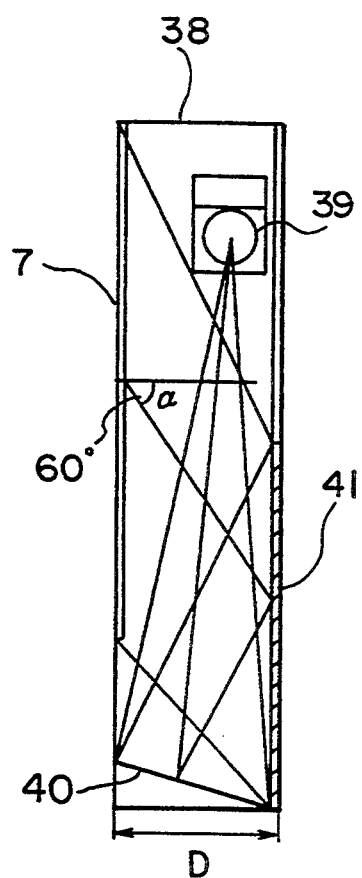
FIG. 12 is a sectional view showing the construction of a rear projection type displaying apparatus in accordance with the present invention, the rear projection type displaying apparatus using an oblique projection optical system.
Figure 13:
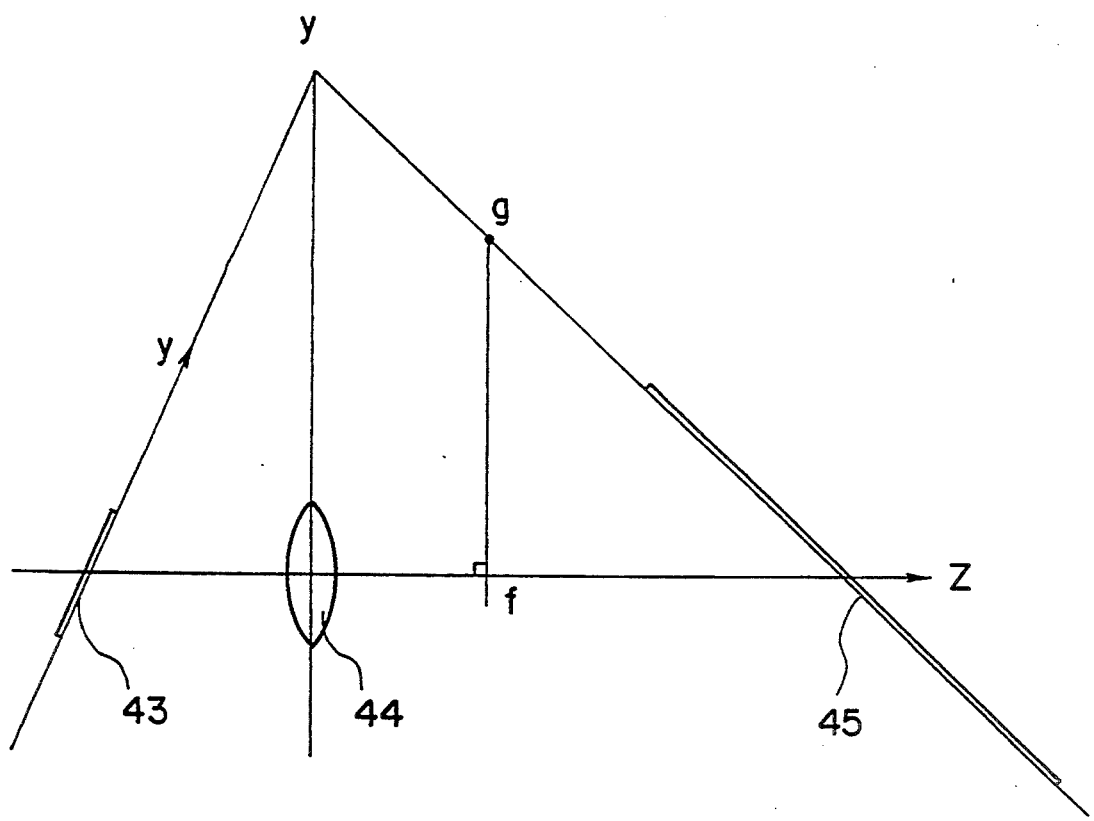
FIG. 13 is a schematic diagram describing an image on an oblique object plane.
Figure 14:
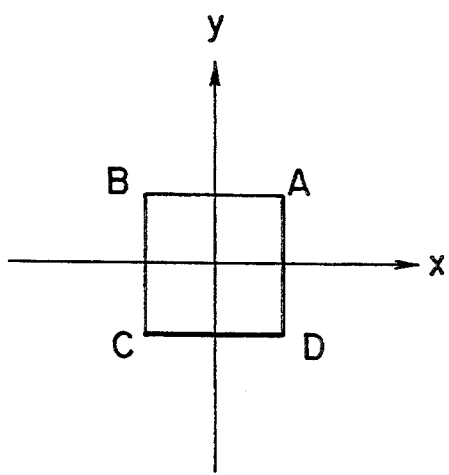
FIG. 14 is a schematic diagram describing the object plane of FIG. 13.
Figure 16:
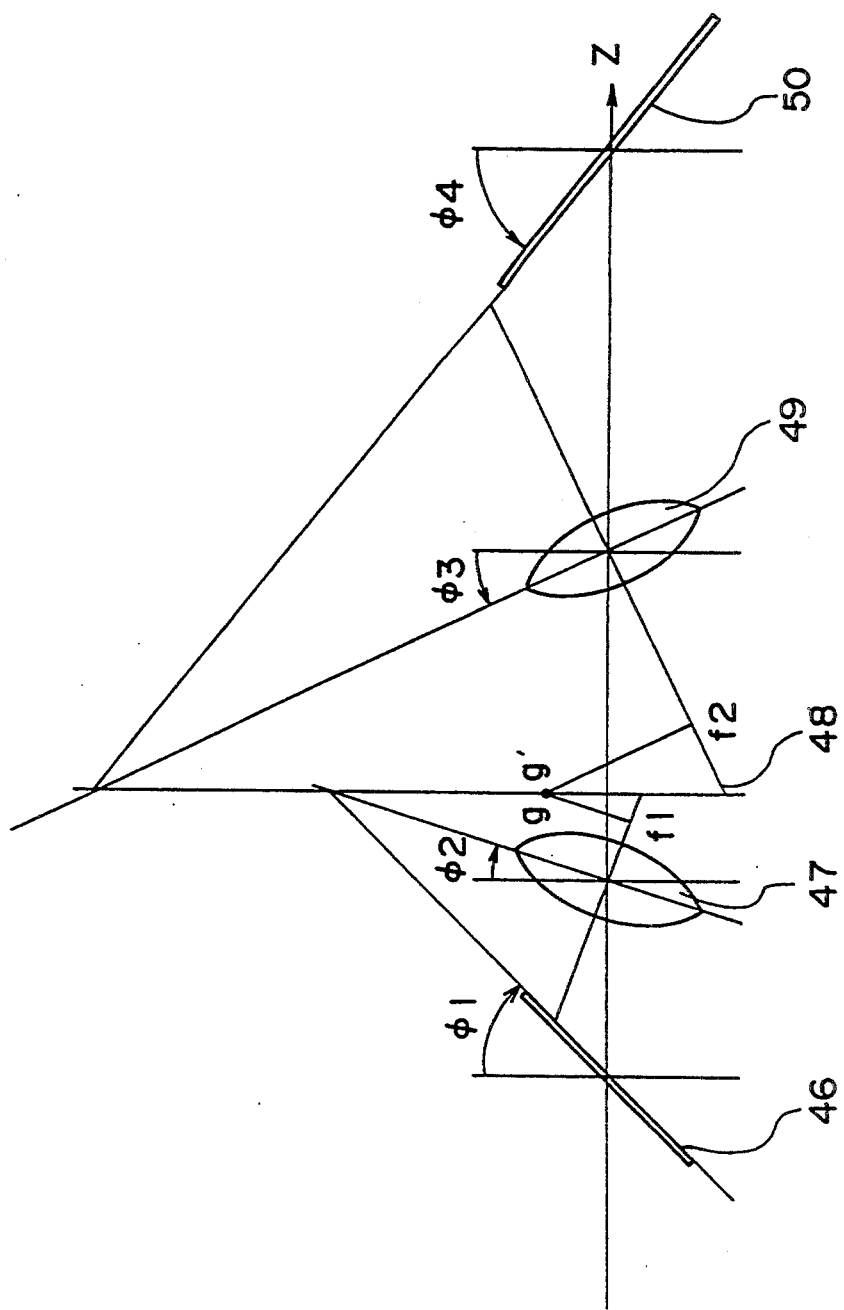
FIG. 16 is a sectional view showing the construction of an oblique projection optical system.
Figure 19:
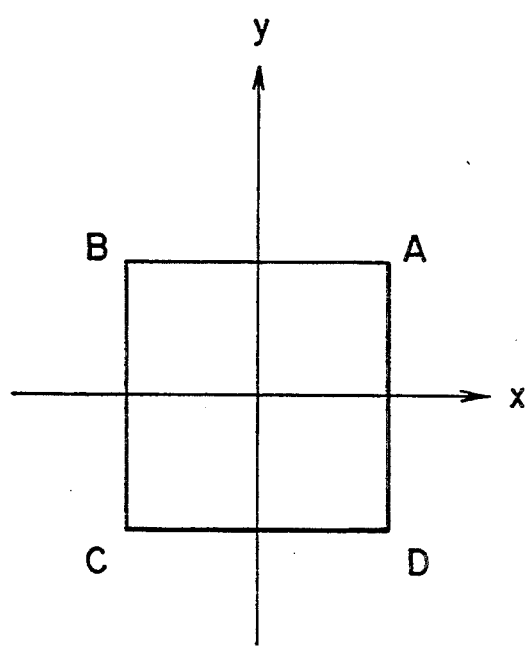
FIG. 19 is a schematic diagram describing an image formed on a screen of FIG. 16.
Figure 20:
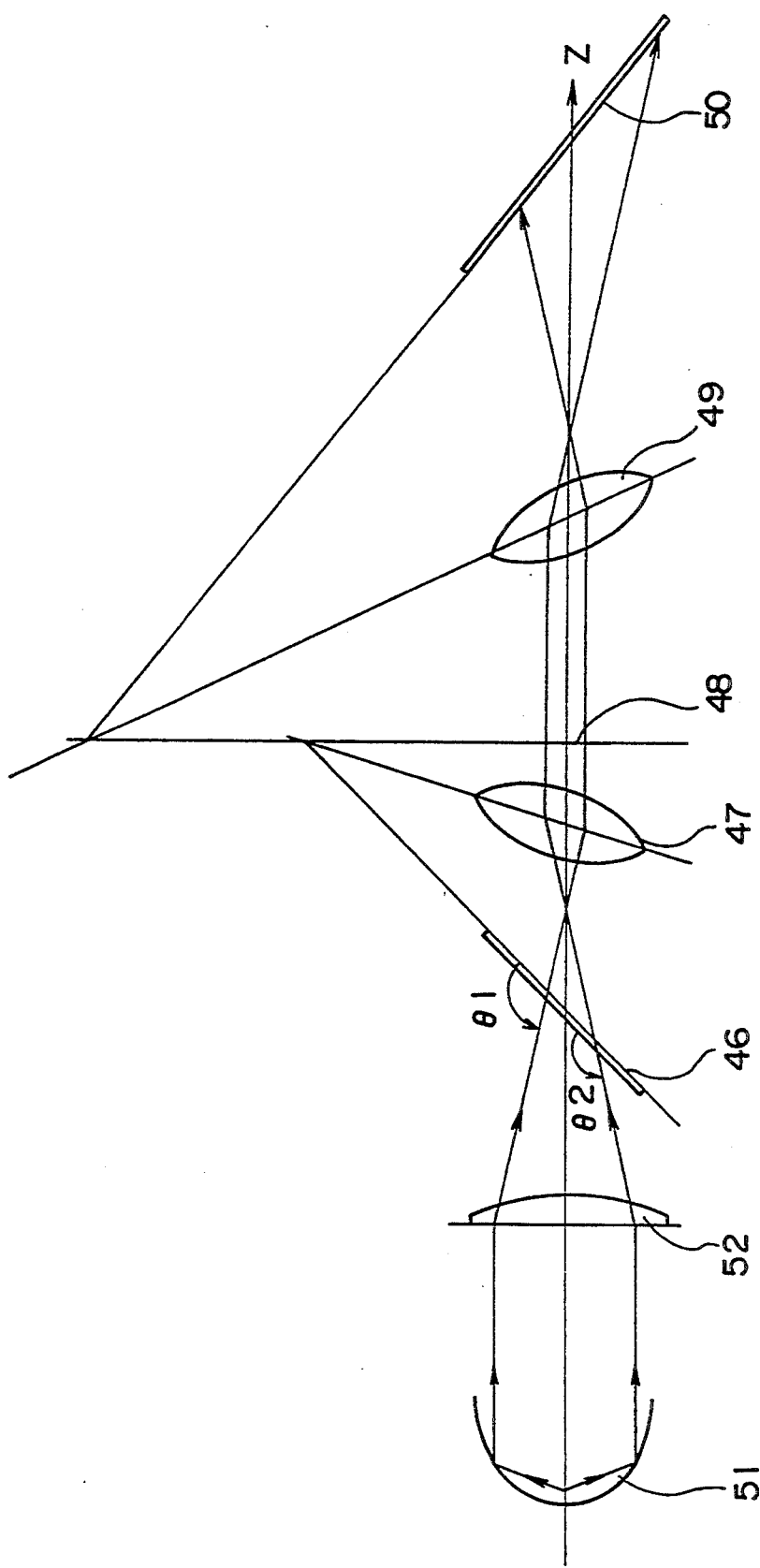
FIG. 20 is a schematic diagram showing an optical path of an oblique projection optical system including a lighting unit.

FIG. 12 shows the construction of an embodiment of the rear projection type displaying apparatus. When rays of light which leave a projection optical unit 39 are reflected by a first mirror 40 and a second mirror 41 and then obliquely strike the screen 7, the thickness D of a cabinet 38 can be decreased.

Figure 6:
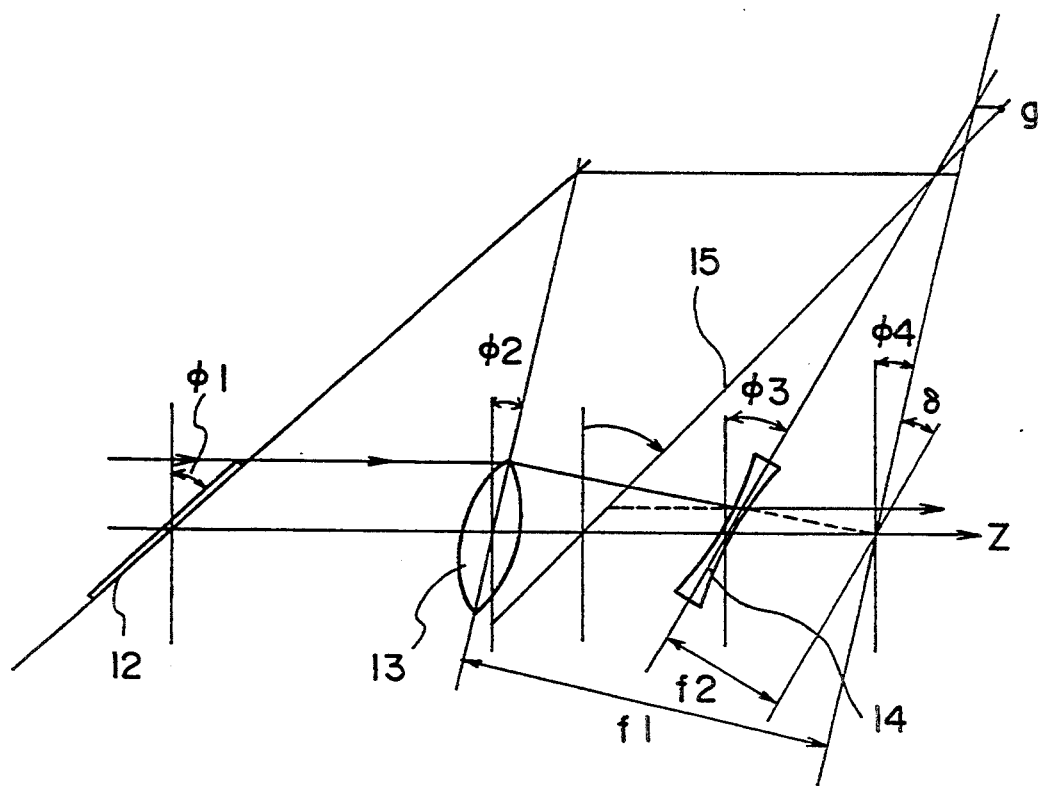
FIG. 6 is a schematic diagram showing the construction of an embodiment of the first projection optical system in accordance with the present invention, the first projection optical system being composed of a positive lens and a negative lens.

FIG. 6 shows the construction of an embodiment of the first projection optical system whose second lens is a negative lens. In this construction, as shown in FIG. 6, the distance of each lens can be shortened to $f1/\cos\phi1 - f2/\cos\phi2$. Thus, the system can be compactly constructed. Like the construction of the above-mentioned embodiment of the first projection optical system shown in FIG. 5, when the line of intersection of a plane in parallel with the axis Z and an intermediate image plane 15, the line of intersection containing the line of intersection of the image side focal plane of a first lens 13 of a first projection optical system and the principal plane of a second lens 14 is referred to as g, an image without a trapezoidal distortion is formed on a a screen 7.

Figure 7:
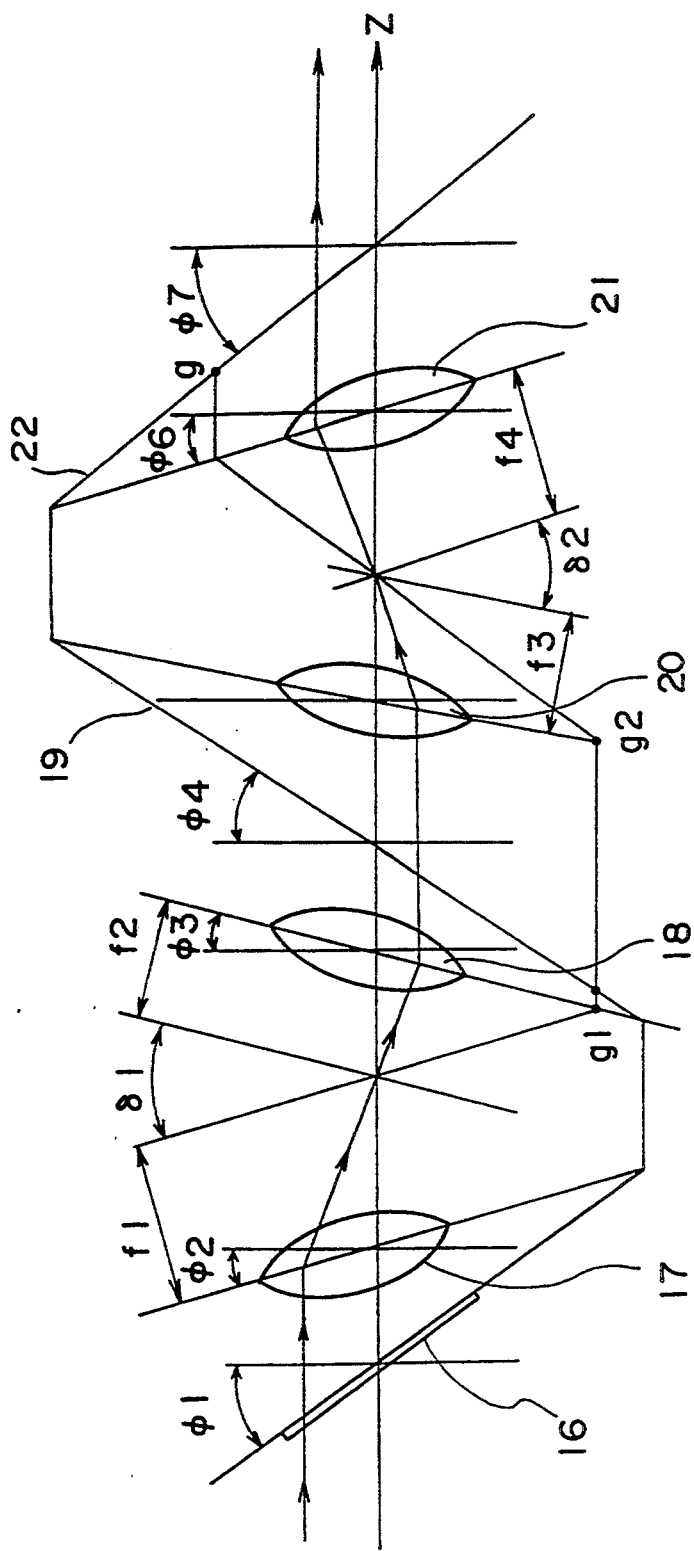
FIG. 7 is a schematic diagram showing the construction of an embodiment of the first projection optical system in accordance with the present invention, the first projection optical system being constructed of two sets of two lenses which are not parallel.

In FIG. 7, a first projection optical system is constructed of two sets of two lenses which are not parallel to each other. In this construction, the inclination of each lens can be reduced. Thus, a high quality image can be readily formed. In other words, a first lens 17 of a first projection optical system and a second lens 18 thereof are inclined by δ1 to each other. The first lens 17 and the second lens 18 are disposed in such a way that the line of intersection of the image side focal plane of the first lens 17 and the object side focal plane of the second lens 18 is present nearly on the axis Z. A third lens 20 of the first projection optical system and a fourth lens 21 thereof are inclined by δ2 to each other. The third lens 20 and the fourth lens 21 are disposed in such a way that the line of intersection of the image side focal plane of the third lens 20 and the object side focal plane of the fourth lens 21 is present nearly on the axis Z. In addition, a second intermediate image plane 22, a second projection optical system 6, and a screen 7 are disposed in such a way that all their prolonged planes intersect on the same line.

In this case, an image on a light bulb 16 passes through the first lens 17 of the first projection optical system and the second lens 18 thereof. Thus, an image with a trapezoidal distortion is formed by the first lens 17 and the second lens 18 on a first intermediate image plane 19. The first intermediate image passes through the third lens 20 of the first projection optical system and the fourth lens 21 thereof. Thus, a second intermediate image with a trapezoidal distortion is formed by the third lens 20 and the fourth lens 21 on a second intermediate image plane 22. As shown in FIG. 7, the line of intersection of the image side focal plane of the first lens 17 and the principal plane of the second lens 18 is referred to as g1. In addition, the line of intersection of a plane which passes through g1 and in parallel with the axis Z and the principal plane of the third lens 20 of the first projection optical system is referred to as g2. Moreover, the line of intersection g passes through the point of intersection of the line of intersection of a plane which contains the point of intersection of the image side focal plane of the third lens 20 of the first projection optical system and the axis Z and g2 and a plane which contains the line of intersection of the principal surface of the fourth lens 21 and in parallel with the axis Z, and the second intermediate image plane 22. As shown in FIG. 3, when the line of intersection g' of the object side focal plane of the second projection optical system 6 and the second intermediate image plane 22 is matched with the line of intersection g, the second intermediate image with the trapezoidal distortion passes through a second projection optical system 6. Thus, an image without a trapezoidal distortion as shown in FIG. 4 is formed by the second projection optical system 6 on the screen 7.

Figure 8:
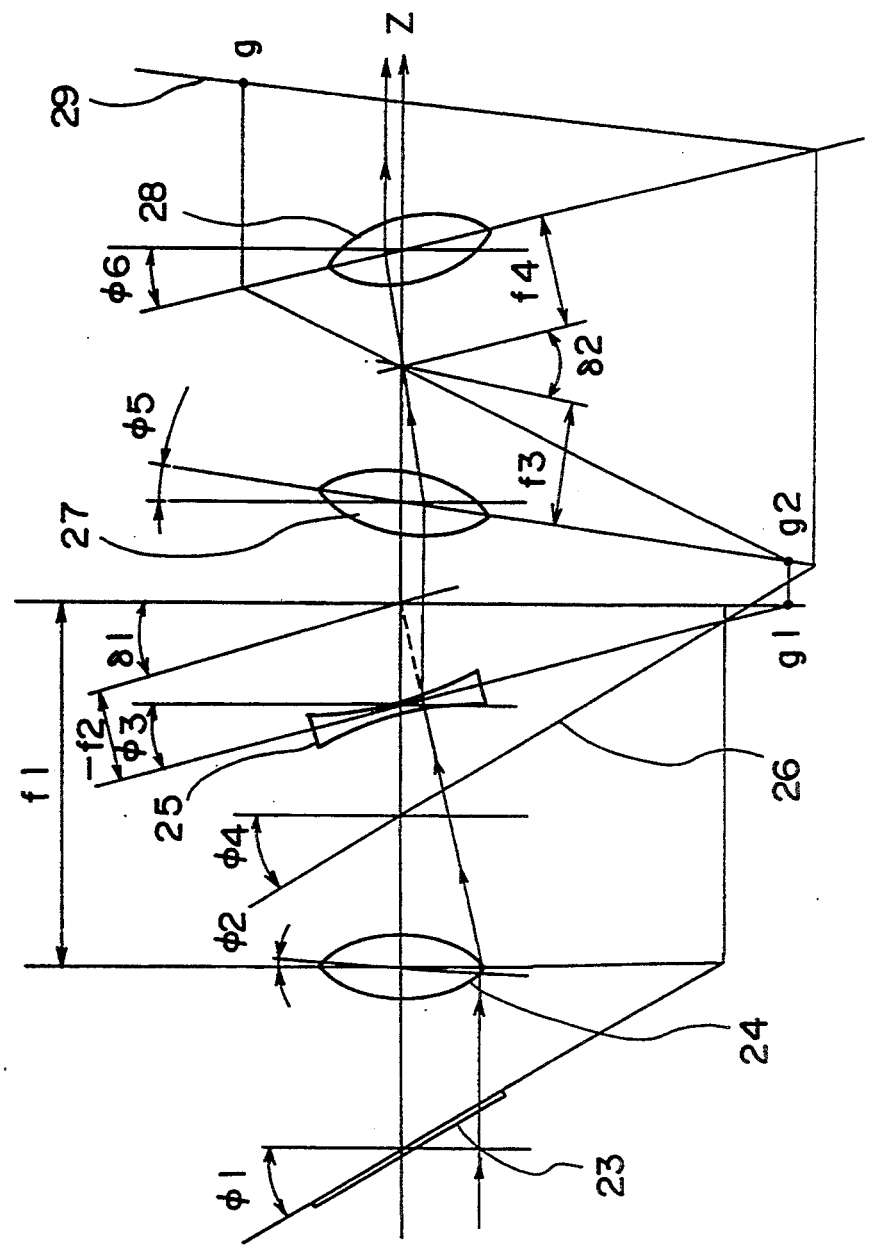
FIG. 8 is a schematic diagram showing the construction of an embodiment of the first projection optical system in accordance with the present invention, the first projection optical system being constructed of two sets of two lenses which are not parallel, one set thereof consisting of a positive lens and a negative lens.

FIG. 8 shows another embodiment of the first projection optical system which is constructed of two sets of two lenses which are not parallel to each other. When a second lens 25 of the first projection optical system is a negative lens, the distance of each lens can be shortened to $f1/\cos \phi 1 - f2/\cos \phi 2$ as shown in the figure. Thus, the system can be compactly constructed. In the figure, reference numeral 23 is a light bulb. Reference numeral 24 is a first lens of the first projection system. Reference numeral 26 is a first intermediate image plane. Reference numeral 27 is a third lens. Reference numeral 28 is a fourth lens. Reference numeral 29 is a second intermediate image surface.

Figure 9:
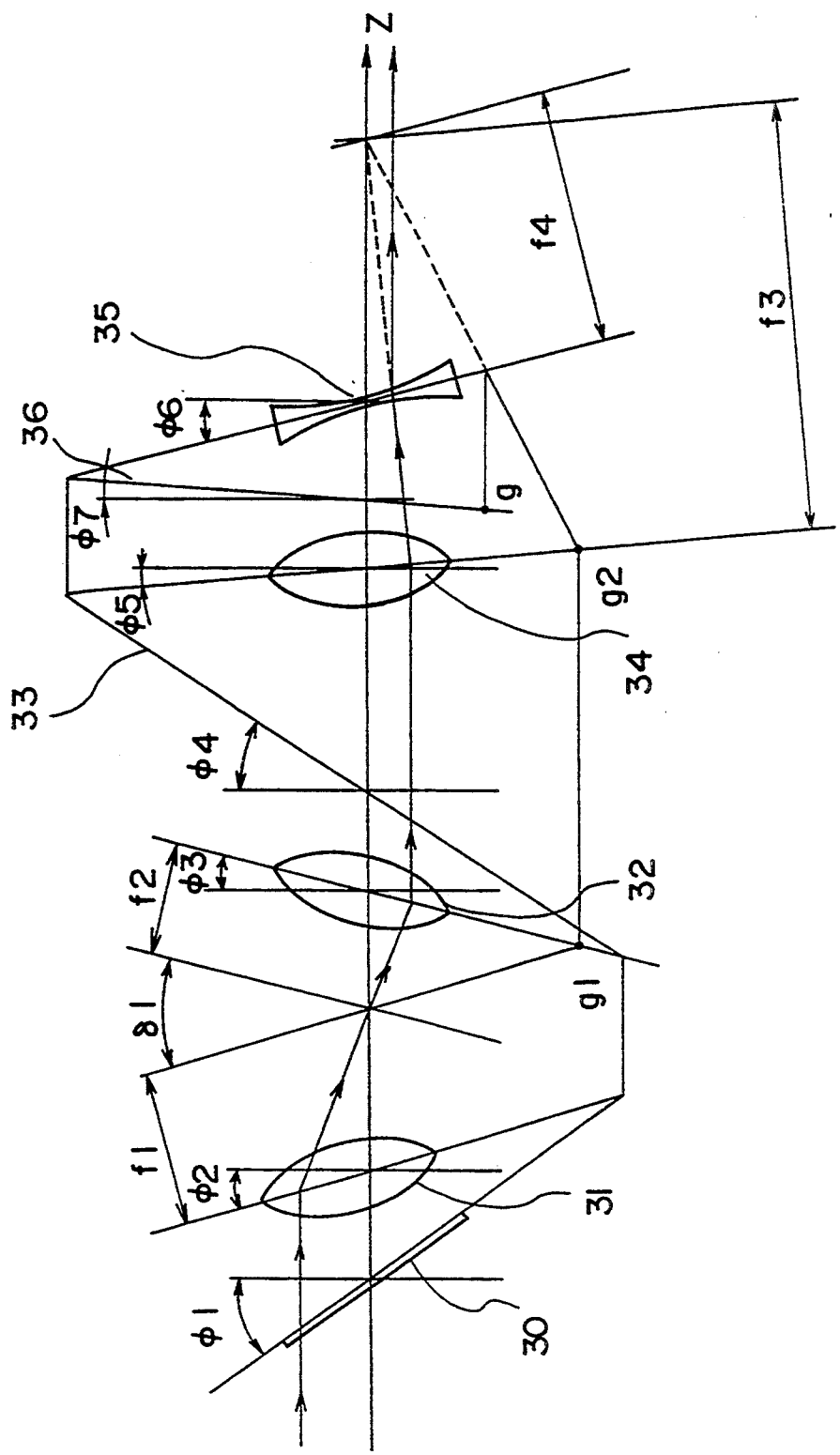
FIG. 9 is a schematic diagram showing the construction of a second embodiment of the first projection optical system in accordance with the present invention, the first projection optical system being constructed of two sets of two lenses which are not parallel, one set thereof consisting of a positive lens and a negative lens.

FIG. 9 shows another embodiment of the first projection optical system which is constructed of two sets of two lenses which are not parallel to each other. When a fourth lens 35 of the first projection optical system is a negative lens, the distance of each lens can be shortened to $f3/\cos \phi 3 - f4/\cos \phi 4$. Thus, the system can be compactly constructed. In the figure, reference numeral 30 is a light bulb. Reference numeral 31 is a first lens of the first projection system. Reference numeral 32 is a second lens of the first projection system. Reference numeral 33 is a first intermediate image plane. Reference numeral 34 is a third lens. Reference numeral 36 is a second intermediate image plane.

Thus, according to the above-mentioned embodiments, in an oblique projection type displaying apparatus comprising a first projection optical means which forms an intermediate image with a trapezoidal distortion and a second projection optical means which forms an image without a trapezoidal distortion, when the first projection optical means is constructed of at least two lenses which are not parallel to each other, an optical modulating means can be illuminated with nearly parallel rays of light. Thus, the unevenness of brightness and contrast on the entire screen can be reduced. When the first projection optical system is constructed of two sets of two lens which are not parallel each other, the inclination of to each lens can be decreased. In other words, the amount of aberration of each lens is decreased. As a result, a projection displaying apparatus with a high image forming property can be provided.

In addition, when a rear projection type displaying apparatus is housed in a cabinet, the volume of the cabinet, in particular, the depth thereof can be remarkably decreased because of the oblique projecting technique.

Figure 21:
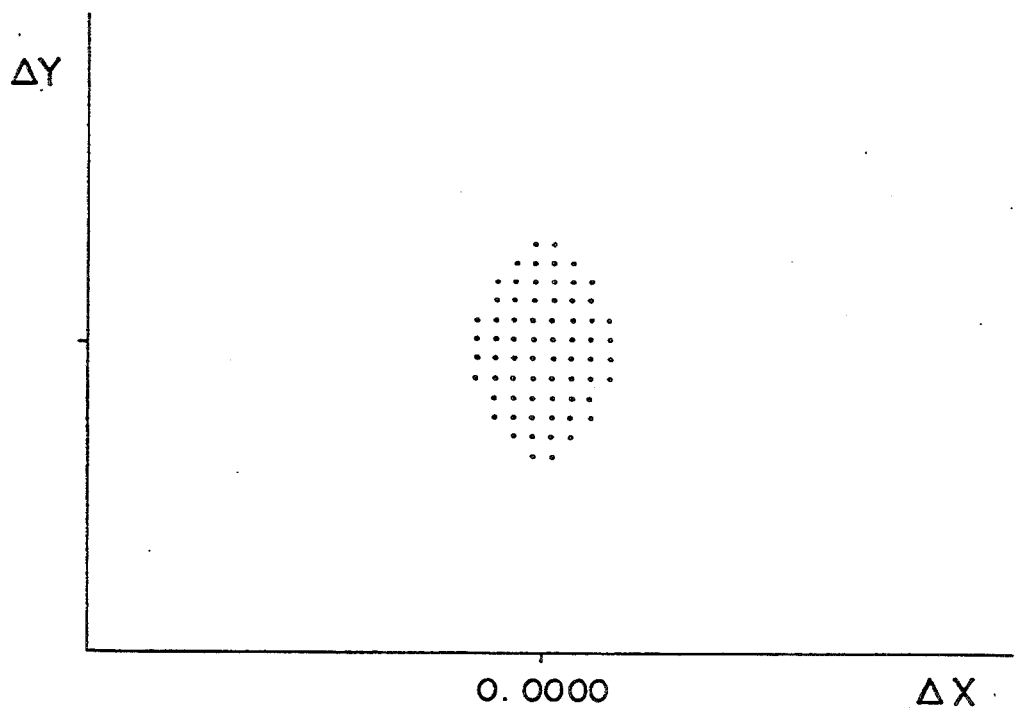
FIG. 21 is a spot diagram of a conventional projection optical system.

According to the above-mentioned projection optical system, the light bulb can be illuminated by parallel rays of light with a nearly constant incident angle. As a result, an oblique projection displaying apparatus with almost even brightness can be provided. However, as shown in a spot diagram of FIG. 21, the resolution on the screen deviates in the vertical direction.

To solve this problem, in the present invention, an aperture stop mechanism is disposed in the oblique projection optical system.

Figure 22:
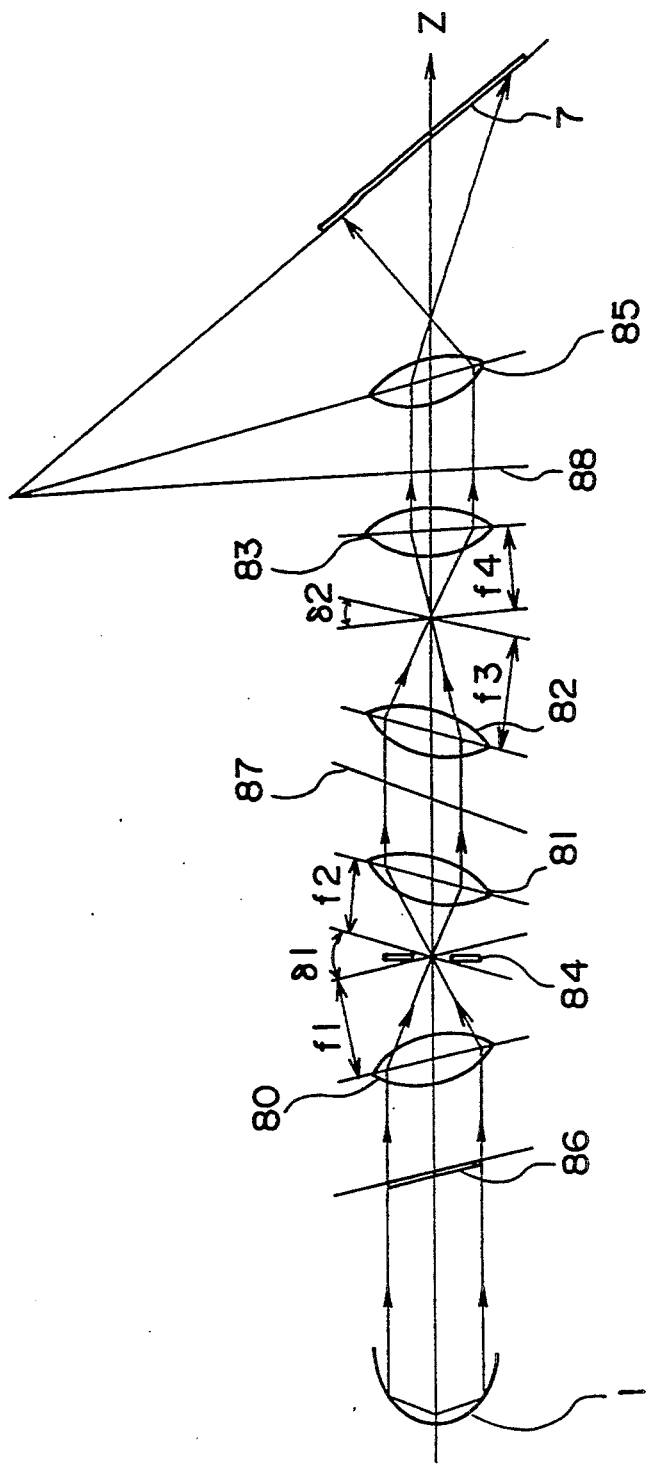
FIG. 22 is a sectional view showing a projection optical system having an aperture stop mechanism in accordance with the present invention.

FIG. 22 shows the construction of an oblique projection optical system which is provided with the above-mentioned aperture stop mechanism. FIGS. 23 (A) to (C) show examples of the shapes of aperture stops.

In FIG. 22, the optical axis of a first lens 80 of a first projection optical system, the optical axis of a second lens 81 thereof, the optical axis of a third lens 82 thereof, the optical axis of a fourth lens 83 thereof, the optical axis of an aperture stop mechanism 84, the optical axis of a second projection optical system 85, the normal of a light bulb 86, and the normal of a screen 7 are placed on the same plane. In the figure, reference numeral 87 is a first intermediate image plane. Reference numeral 88 is a second intermediate image plane.

In the figure, a light source 1 is a xenon lamp with a parabolic reflection mirror or a metal halide lamp therewith. The light bulb 2 has a construction where grid-shaped electrodes are disposed on a liquid crystal so as to control the transmittance of each picture element. The aperture stop mechanism 84 is one of the shapes shown in FIG. 23.

The first lens 80 of the first projection optical system and the second lens 81 thereof are inclined by an angle δ1 to each other. The first lens 80 and the second lens 81 are disposed in such a way that the line of intersection of the image side focal plane of the first lens 80 and the object side focal plane of the second lens 81 is present on the axis Z. The aperture stop mechanism is disposed at the position where the focal plane of the first lens 80 and the focal plane of the second lens 81 are intersected on the axis Z. In addition, the third lens 82 of the first projection optical system and the fourth lens 83 thereof are inclined by an angle δ2 each other. The third lens 82 and the fourth lens 83 are disposed in such a way that the line of intersection of the image side focal plane of the third lens 82 and the object side focal plane of the fourth lens 83 is present nearly on the axis Z. Moreover, the second intermediate image plane 88, the second projection optical system 85, and the screen 7 are disposed in such a way that their prolonged planes intersect on the same line.

Figure 24:
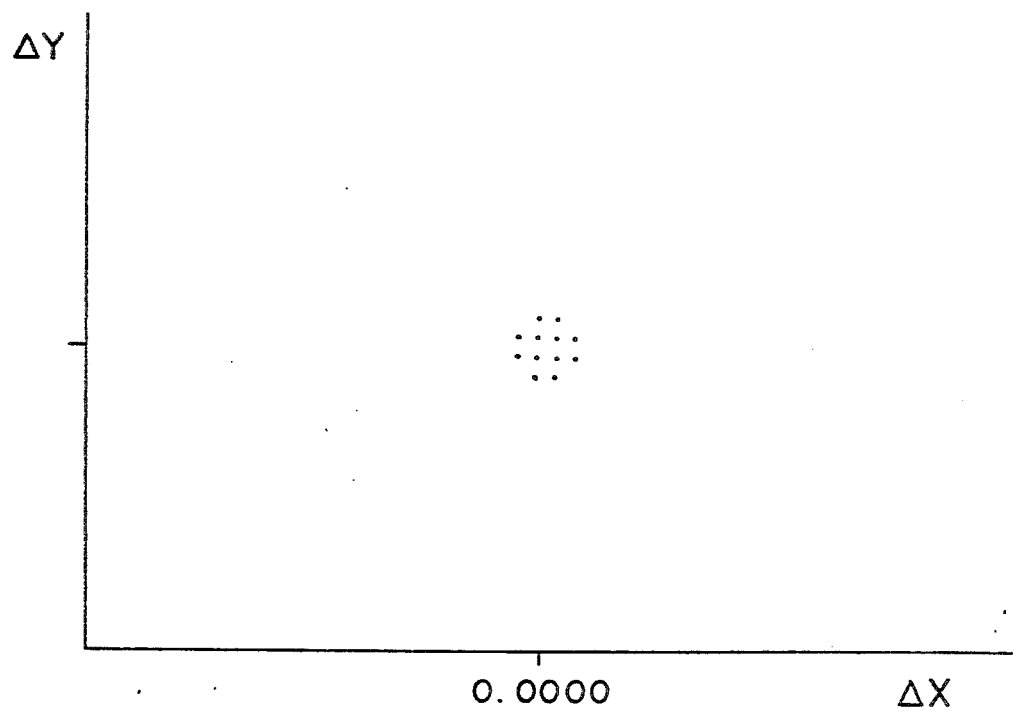
FIG. 24 is a spot diagram in the case where an aperture stop mechanism in accordance with the present invention is used.

Rays of light which are radiated from the light source 1 illuminate the light bulb 86 nearly in parallel. Thus, on the entire surface of the light bulb 86, the brightness and contrast of the image become even. An image on the light bulb 86 passes through the first lens 80 of the first projection optical system, the second lens 81 thereof, and the aperture stop mechanism with the shape as shown in FIG. 23 (A). Thus, an image with a trapezoidal distortion is formed on the first intermediate image plane 87. Thereafter, the first intermediate image passes through the third lens 82 of the first projection optical system and the fourth lens 83 thereof. Thus, a second intermediate image with a trapezoidal distortion is formed on the second intermediate image plane 88. Next, the second intermediate image passes through the second projection optical system 85. Thus, an image without a trapezoidal distortion is formed on the screen 7. At this point, the image on the screen 7 does not greatly deviate on the screen as shown in a spot diagram of FIG. 24. Thus, an image with a high resolution, high brightness, and less unevenness can be obtained.

The aperture stop mechanism shown in FIG. 23 (B) is in a diamond shape. Like the above-mentioned embodiments, the aperture stop mechanism stops vertical rays of light with a low resolution which are radiated from the light source 1 shown in FIG. 22. On the other hand, the aperture stop mechanism allows the horizontal rays of light with a high resolution to pass through. As a result, even if a part of the rays of light is stopped by the aperture stop mechanism 84 so as to improve the resolution, the amount of loss of amount of light in the image is small. In other words, even if the aperture stop mechanism in the shape as shown in FIG. 23 (B) is used for the optical system shown in FIG. 22, the resultant image does not greatly deviate on the screen 7 as shown in the spot diagram of FIG. 24. As a result, an image with high resolution, high brightness, and low unevenness can be obtained.

The aperture stop mechanism 84 shown in FIG. 23 (C) is in a diamond shape where each inner angle is round. In this construction, like the above-mentioned embodiments, an image with high resolution, high brightness, and low unevenness can be obtained.

As described above, in the oblique projection optical system, even if rays of light are stopped by an aperture stop mechanism, the resolution can be improved with a small loss of brightness.

When the rear projection type displaying apparatus is housed in a cabinet, the volume of the cabinet, in particular, the depth thereof can be remarkably reduced because of oblique projection. As a result, a compact displaying apparatus with high resolution and small loss of brightness can be provided.

The position of the aperture stop mechanism is not limited to the position shown in FIG. 22. In other words, when the aperture stop mechanism is disposed at the position where the line of intersection of the focal planes of two positive lenses which are not parallel to each other intersects with the axis Z, the same effect as the above-mentioned embodiment can be obtained.

In addition, at the position where the line of intersection of the focal planes of the third lens 82 and the fourth lens 83 intersects the axis Z as shown in FIG. 22 or at the position where the line of intersection of the focal planes of the first lens 3 and the second lens 4 intersects the axis Z as shown in FIG. 1, the aperture stop mechanism can be disposed.

Moreover, at the position where the line of intersection of the focal planes of the third lens 27 and the second lens 28 intersects the axis Z as shown in FIG. 8 or at the position where the line of intersection of the focal planes of the first lens 31 and the second lens 32 intersects the axis Z as shown in FIG. 9, the aperture stop mechanism can be disposed.

Next, a lighting unit will be described.

Figure 25:
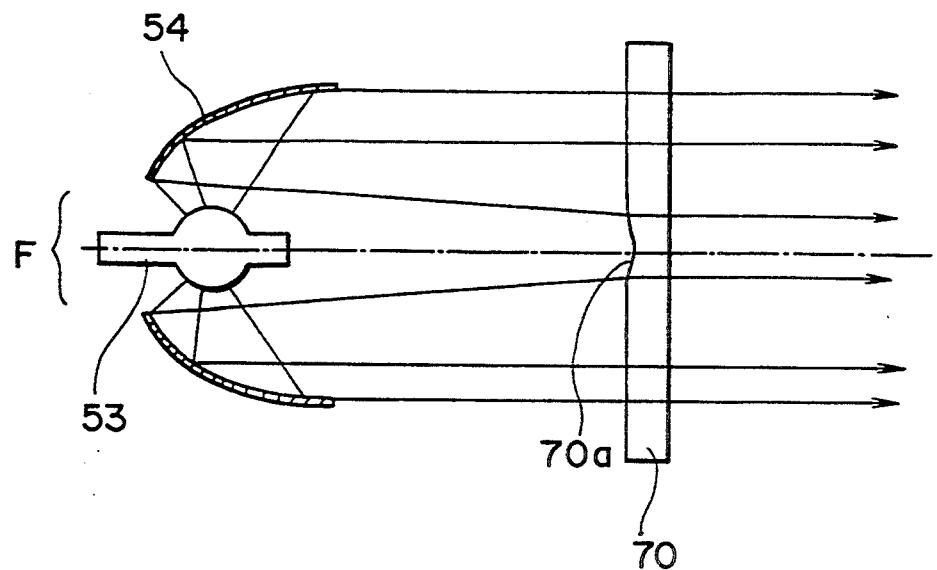
FIG. 25 is a sectional view showing a lighting optical unit fur use in a projection type displaying apparatus in accordance with the present invention.

FIG. 25 is a sectional view showing principal portions of a first embodiment of a lighting unit in accordance with the present invention.

In this construction, a lamp 53 is disposed at a focal position of a reflector 54 which is in a revolutionary paraboloid shape. In the front of the reflector 54, an optical device 70 is disposed. One surface of the optical device 70 has a concave surface 70a in the center thereof, the periphery thereof having a surface perpendicular to the optical axis. The other surface of the optical device 70 is perpendicular to the optical axis. The degree of inclination of the concave surface 70a of the optical device 70 is greatest in the center portion.

Thus, rays of light which are radiated from the lamp 53 are reflected by the reflector 54. The resultant rays of light enter the optical device 70. A center F portion of the reflector 54 does not emit rays of light. When a light emitting portion of the lamp 53 is very small, rays of light which are radiated from the lamp 53 and reflected by the reflector 54 which is of the parabolic surface shape become perfectly parallel. However, since the size of the light emitting portion of the lamp 53 is of the order of several millimeters, rays of light which are emitted from positions apart from the focal position of the reflector 54 leave the reflector 54 with angles in the range from 0 to several degrees.

Since the rays of light have angular components ranging from 0 to several degrees, in a position at a particular distance from the reflector 54, rays of light with a particular angle reach the center portion of this position. When the optical device 70 is disposed in this position, the rays of light are refracted on the concave surface 70a of the optical device 70. Rays of light with particular angular components become parallel with the optical axis. The periphery of the optical device 70 allows rays of light to pass through as they are. Thus, the rays of light which pass through all the portions from the center to the periphery of the optical device 70 have parallel components.

Figure 26:
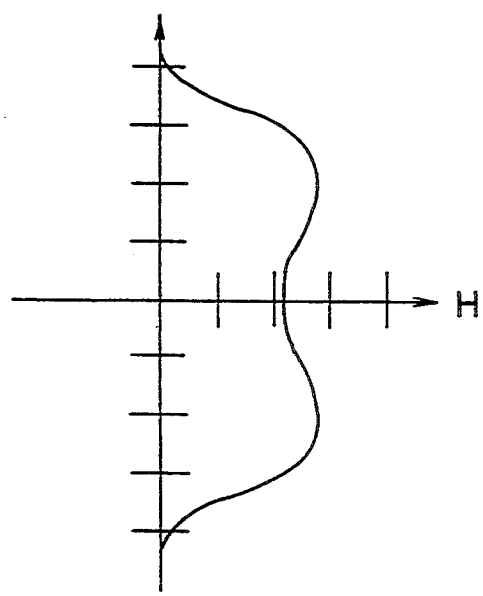
FIG. 26 is a chart showing a distribution of parallel rays of light of the lighting optical unit in accordance with the present invention.
Figure 31:
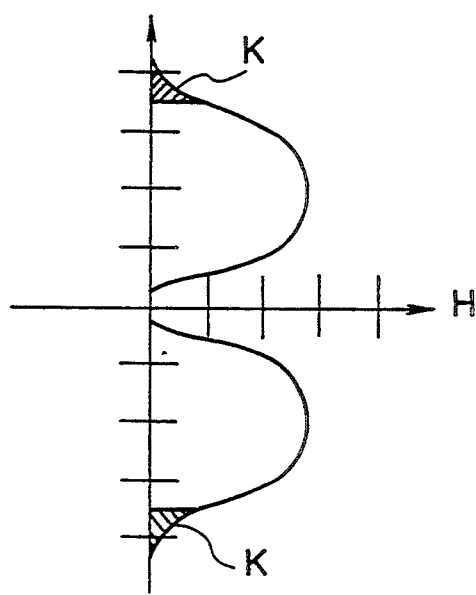
FIG. 31 is a chart showing a distribution of parallel rays of light of the lighting optical unit for use in the conventional projection type displaying apparatus.

Thus, the lighting unit which radiates parallel rays of light even from the center portion thereof as shown in FIG. 26 rather than rays of light with a distribution where the intensity of light is low at the center portion as shown in FIG. 31 can be provided.

Figure 27:
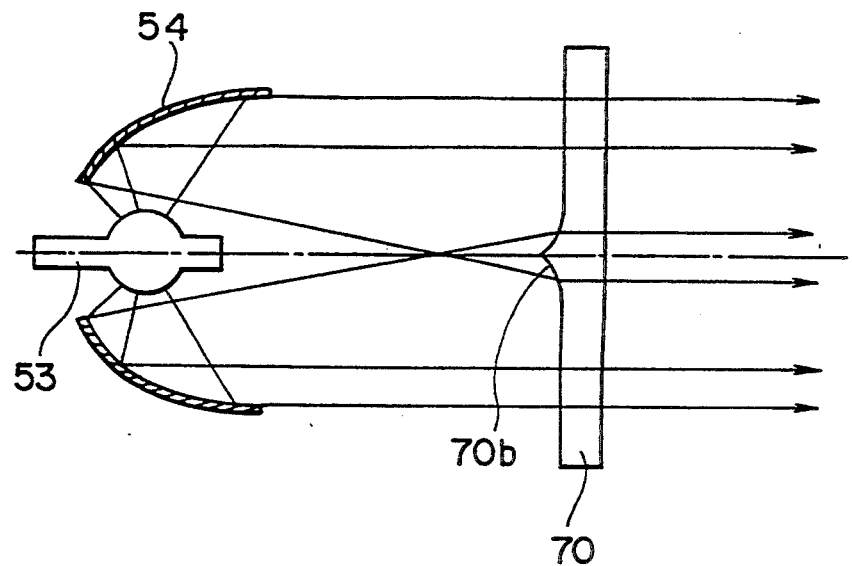
FIG. 27 is a sectional view showing the construction of another embodiment of the lighting optical unit for use in the projection type displaying apparatus in accordance with the present invention.

FIG. 27 is a sectional view showing principal portions of a second embodiment of the lighting unit. Like the first embodiment, this lighting unit comprises a lamp 53, a reflector 54, and an optical device 70. In the optical device 70 of this embodiment, one surface has a convex surface 70b at the center portion thereof, the periphery thereof being perpendicular to the optical axis. The other surface of the optical device 70 is perpendicular to the optical axis. The degree of inclination of the convex surface 70b of the optical device 70 is the greatest at the center portion thereof.

Thus, like the first embodiment, rays of light with angular components ranging from 0 to several degrees which enter the vicinity of the center portion are refracted on the convex surface 70b of the optical device 70. Rays of light with particular angular components become parallel. Rays of light which enter the periphery of the optical device 70 pass through the optical device 70 as they are. Thus, rays of light which pass through all the portions from the center to the periphery of the optical device 70 have parallel components.

Thus, like the first embodiment, the lighting unit which radiates parallel rays of light even from the center portion thereof as shown in FIG. 26 rather than rays with a distribution where the intensity of light is low at the center portion as shown in FIG. 31 can be provided.

Figure 28:
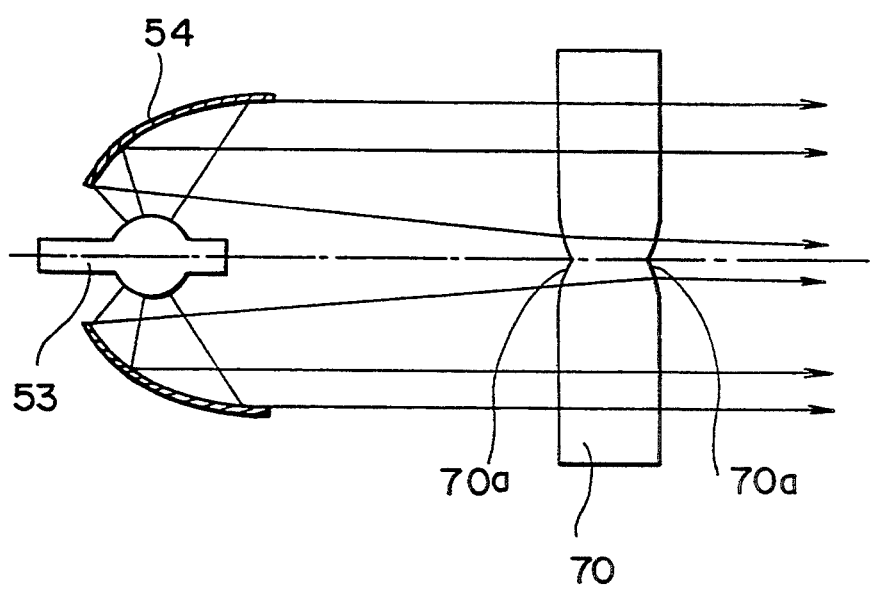
FIG. 28 is a sectional view showing the construction of a further embodiment of the lighting optical unit for use in the projection type displaying apparatus in accordance with the present invention.

FIG. 28 is a sectional view showing principal portions of a third embodiment of the lighting unit. Like the first embodiment, the lighting unit of this embodiment comprises a lamp 53, a reflector 54, and an optical device 70. Both the surfaces of the optical device 70 of this embodiment have concave surfaces 70a and 70a at the center portions thereof, respectively. The periphery of each surface is perpendicular to the optical axis. The degree of inclination of the concave portions 70a and 70a of the optical device 70 is greatest at the center portions thereof.

Thus, like the first embodiment, rays of light with angular components ranging from 0 to several degrees which enter the vicinity of the center portion of the optical device 70 are refracted on the first concave surface 70a thereof and then on the second concave surface 70a thereof. Thus, rays of light with particular angular components become parallel with the optical axis. Rays of light which enter the periphery of the optical device 70 pass through as they are. Thus, rays of light which pass through all the portions from the center portion to the periphery have parallel components.

Thus, like the above-mentioned embodiment, the lighting unit which radiates parallel rays of light even from the center portion thereof as shown in FIG. 26 rather than rays of light with a distribution where the intensity of light is low at the center portion as shown in FIG. 31 can be provided.

Figure 29:
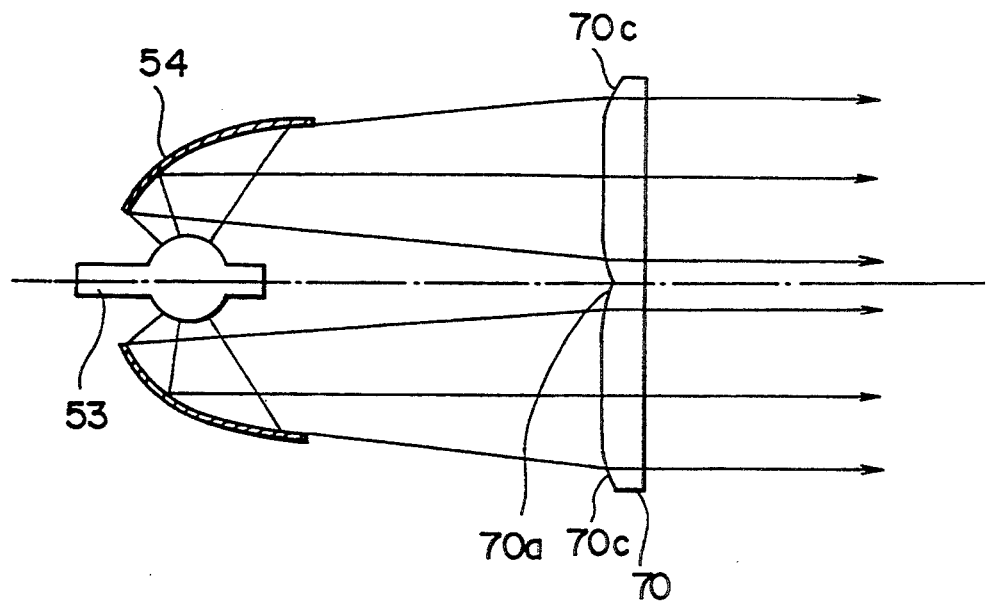
FIG. 29 is a sectional view of a further other embodiment of the lighting optical unit for use in the projection type displaying apparatus in accordance with the present invention.
Figure 30:
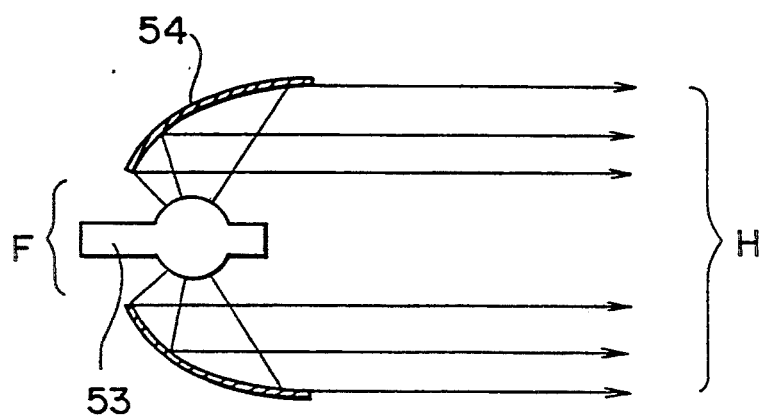
FIG. 30 is a sectional view showing a lighting optical unit for use in a conventional projection type displaying apparatus.

FIG. 29 is a sectional view showing principal portions of a fourth embodiment of the lighting unit. Like the first embodiment, the lighting unit comprises a lamp 53, a reflector 54, and an optical device 70. One surface of the optical device 70 has a concave surface 70a at the center portion thereof. The portion extended from the end of the concave portion 70a to the position which accords with the diameter of the reflector 54 is perpendicular to the optical axis. A periphery 70c of the optical device 70 gradually outwardly becomes thin. The other surface of the optical device 70 is perpendicular to the optical axis. The degree of inclination of the concave portion 70a is greatest at the center portion thereof.

Thus, like the first embodiment, rays of light with angular components ranging from 0 to several degrees which enter the vicinity of the center portion are refracted on the concave surface 70a of the optical device 70. Thus, rays of light with particular angular components become parallel with the optical axis. Rays of light with particular outward angular components which enter the periphery 70c become parallel with the optical axis or are bent inwardly to some extent. Rays of light which enter the center portion which is perpendicular to the optical axis pass through the optical device 70 as they are. Thus, rays of light which pass through all the portions from the center portion to the periphery of the optical device 70 have parallel components or nearly parallel components.

As a result, a lighting unit which radiates parallel rays of light even from the center portion thereof as shown in FIG. 26 rather than rays of light with a distribution where the intensity of light is low at the center portion as shown in FIG. 31 can be provided. In addition, in this construction, rays of light which enter a peripheral portion K of FIG. 31 can be used.

As described above, rays of light which are radiated from the lamp and reflected by the reflector do not have parallel components at the center portion of the optical axis and in the vicinity thereof. However, according to the above-mentioned embodiments, since the optical device is disposed in front of the reflector, rays of light can have parallel components at the center portion thereof.

Moreover, as described in the fourth embodiment, when the optical device where the wall of a limited portion of the periphery gradually outwardly becomes thin is used, rays of light at the periphery thereof can be also used.

Thus, when an image formed by a liquid crystal or the like is projected by using the above-mentioned lighting unit, an enlarged projection image with an even brightness can be obtained.

FIGS. 32 to 37 show other embodiments of the above-mentioned optical device.

Figure 32:
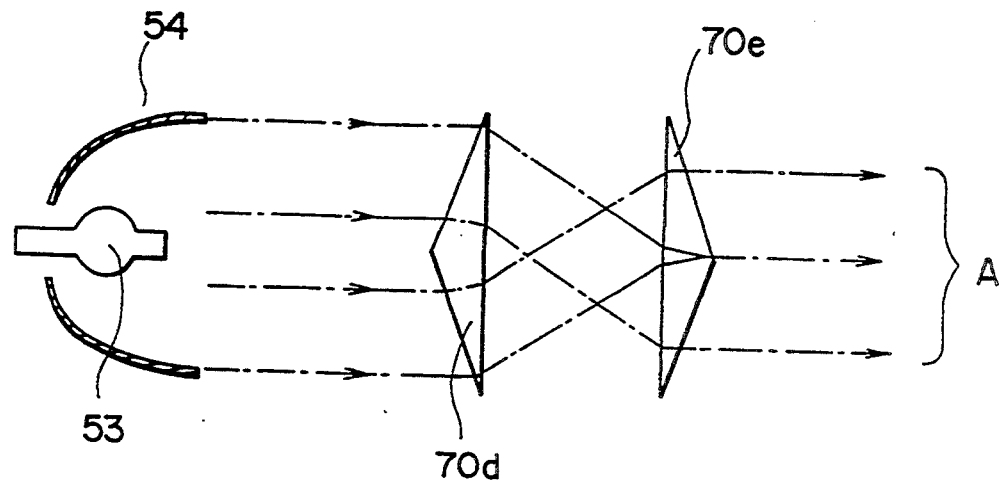
FIGS. 32 to 36 are sectional views showing modifications of optical devices.
Figure 37:
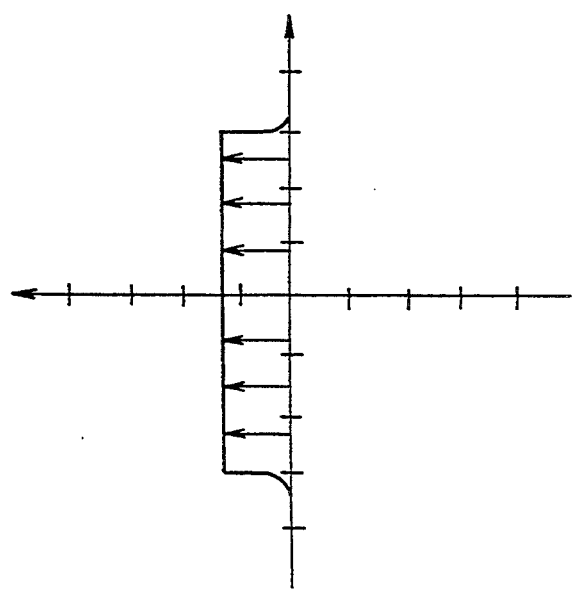
FIG. 37 is a chart showing a distribution of parallel rays of light of the embodiments of FIGS. 32 to 36.

In an embodiment shown in FIG. 32, two optical devices 70d and 70e which are in a circular cone shape are disposed in such a way that their bottoms are opposed to each other. When a reflector 54 has a parabolic surface, rays of light which are radiated from a lamp 53 are reflected by the reflector 54 as nearly parallel rays of light. These nearly parallel rays of light enter the first circular cone shape optical device 70d. The rays of light are refracted by the first circular cone shape optical device 70d and thereby the positions of rays of light are vertically inverted about the optical axis. In these positions, the second circular cone shape optical device 70e is disposed. The inverted rays of light are refracted by the second circular cone shape optical device 70e. Thus, nearly parallel rays of light A can be obtained. As a result, by the two circular cone shape optical devices 70d and 70e shown in FIG. 32, a distribution of rays of light as shown in FIG. 37 can be obtained instead of a conventional distribution of rays of light where the center portion is dark as shown in FIG. 31.

Figure 33:
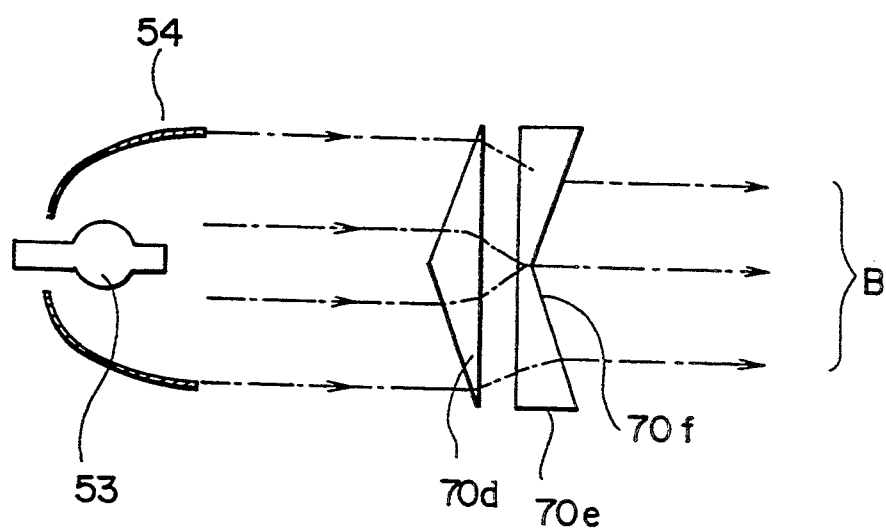

In an embodiment shown in FIG. 33, an exit side optical device 70e of two optical devices 70d and 70e has a concave shape circular cone surface 70f. In this construction, when a reflector 54 has a parabolic surface, rays of light which are radiated from a lamp 53 are reflected by a parabolic surface shape reflector 54 as nearly parallel rays of light. The parallel rays of light enter into and are refracted by a first circular cone shape optical device 70d. The refracted rays of light also pass through the vicinity of the optical axis where no parallel components are present in the related art. When the second circular cone shape optical device 70e is disposed at this position, the rays of light are refracted and become nearly parallel rays of light B. As a result, by the two circular cone shape optical devices 70d and 70e shown in FIG. 32, a distribution of rays of light shown in FIG. 37 can be obtained instead of a conventional distribution of rays of light where the center portion of the optical axis is dark as shown in FIG. 31.

Figure 34:
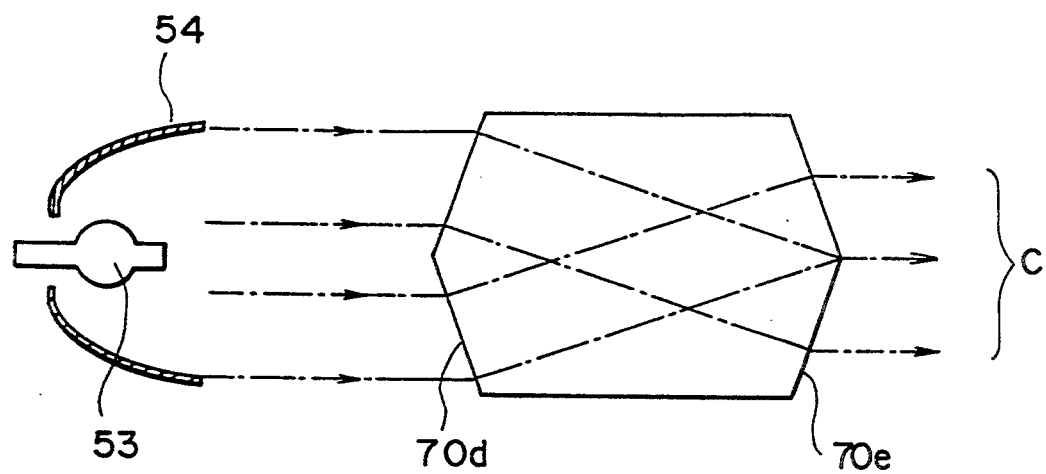
Figure 35:
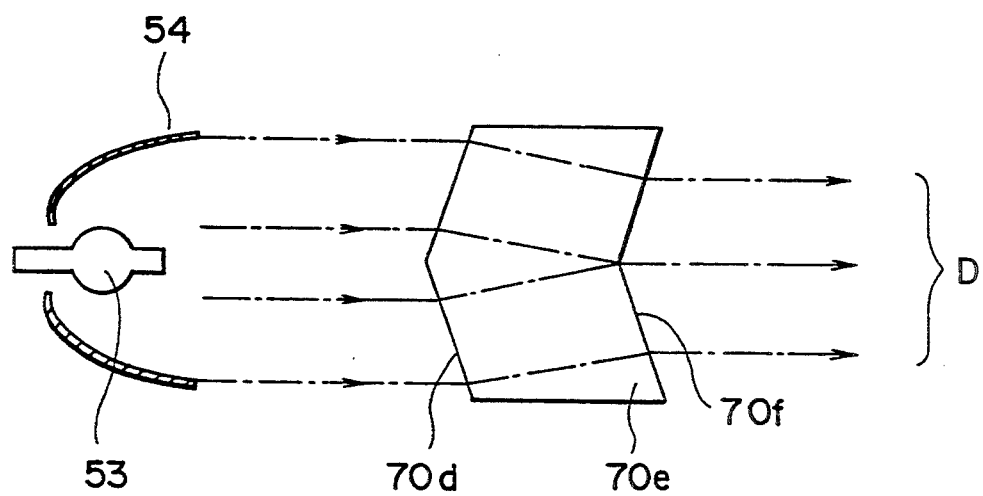

In an embodiment shown in FIG. 34, the two optical devices 70d and 70e shown in FIG. 32 are integrally constructed. In an embodiment shown in FIG. 35, the two optical devices 70d and 70e shown in FIG. 33 are integrally constructed. In these embodiments, the same effects as those shown in FIGS. 32 and 33 can be obtained, respectively.

Figure 36:
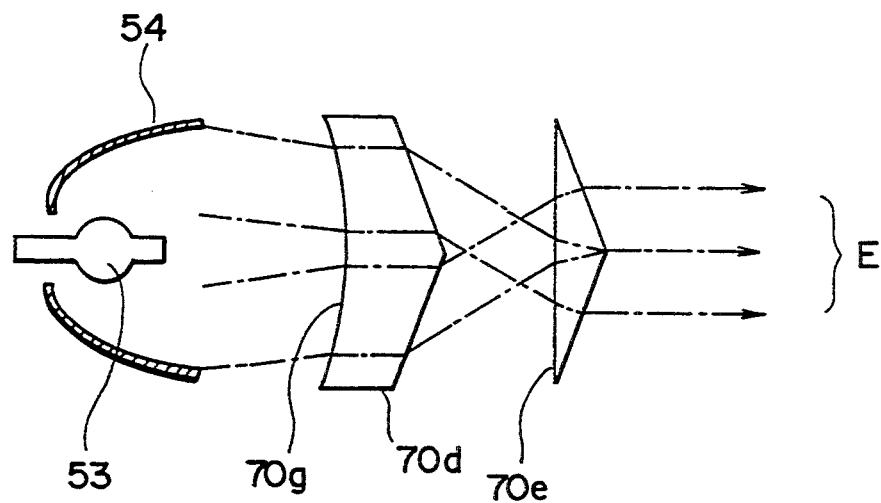

In an embodiment shown in FIG. 36, the incident surface of the circular cone shape optical device 70d is a concave surface 70g. The exit surface of the circular cone shape optical device 70e is the same as that shown in FIG. 32.

In these embodiments, when rays of light which are radiated from a lamp enter into the above-mentioned circular cone shape optical device, parallel rays of light with an even distribution of the intensity of light can be obtained. Thus, with nearly parallel rays of light as a light source, an image with an even brightness can be obtained.

Next, a reflection mirror will be described.

Figure 38A:
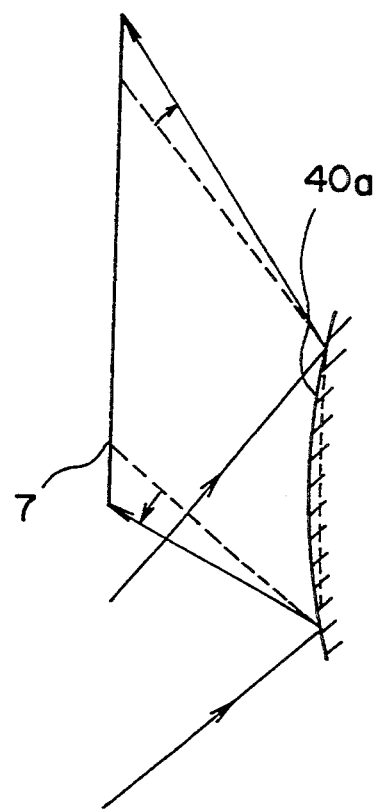
FIGS. 38 (A) and (B) are sectional views showing embodiments of reflection mirrors in accordance with the present invention.
Figure 38B:
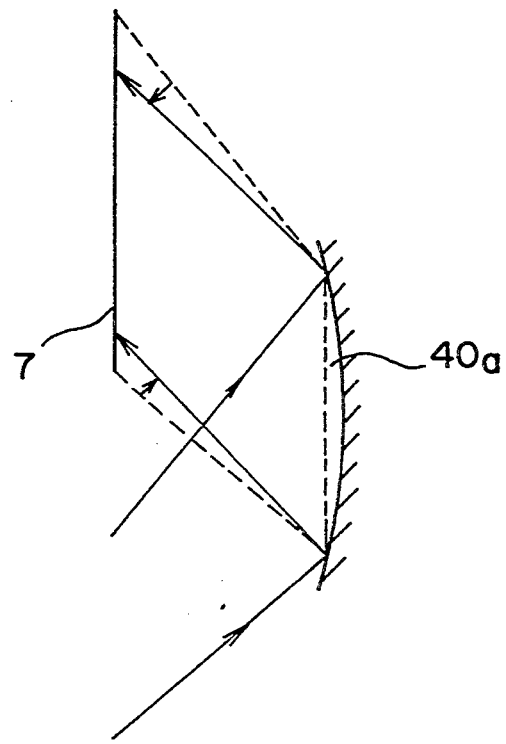

FIGS. 38 (A) and 38 (B) are sectional views of reflection mirrors in accordance with the present invention. When an image has a distortion as shown in FIG. 39, the distortion is compensated in each arrow direction.

Figure 41:
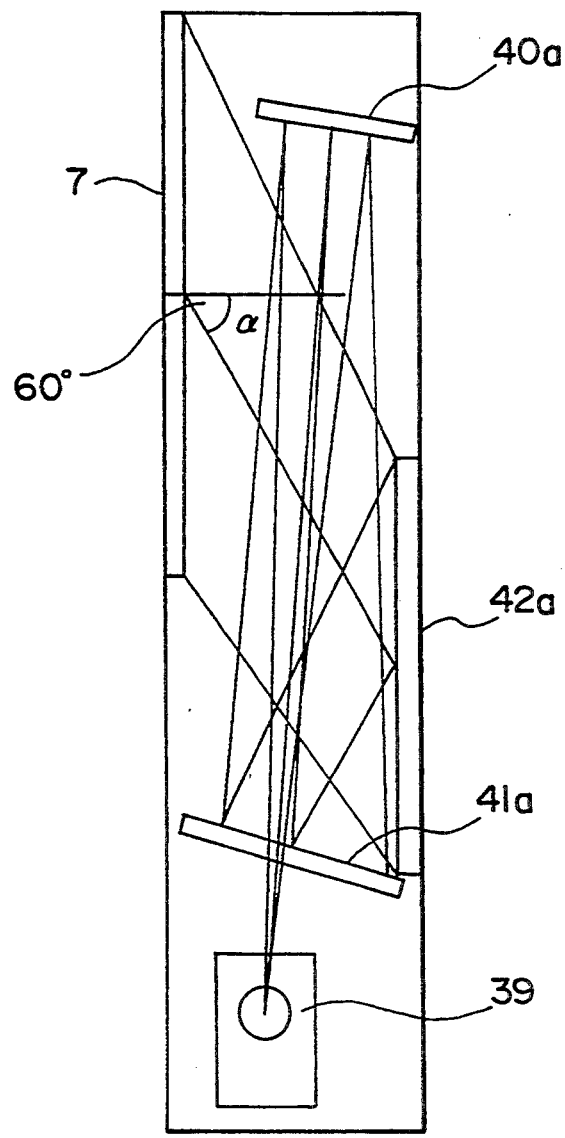
FIG. 41 is a sectional view showing the construction of an example of the projection type displaying apparatus using the reflection mirror.

FIG. 41 shows an example of the projection type displaying apparatus in accordance with the present invention. The projection type displaying apparatus shown in the figure comprises a projection optical unit 39, a first reflection mirror 40a, a second reflection mirror 41a, a third reflection mirror 42a, and a screen 7. As shown in FIG. 1, the projection optical unit 39 comprises a light source 1, a light bulb 2, a first lens 3 of a first projection optical system, a second lens 4 thereof, and a second projection optical system 6. The operation of the projection optical unit 39 has been described with reference to FIG. 1.

Figure 39:
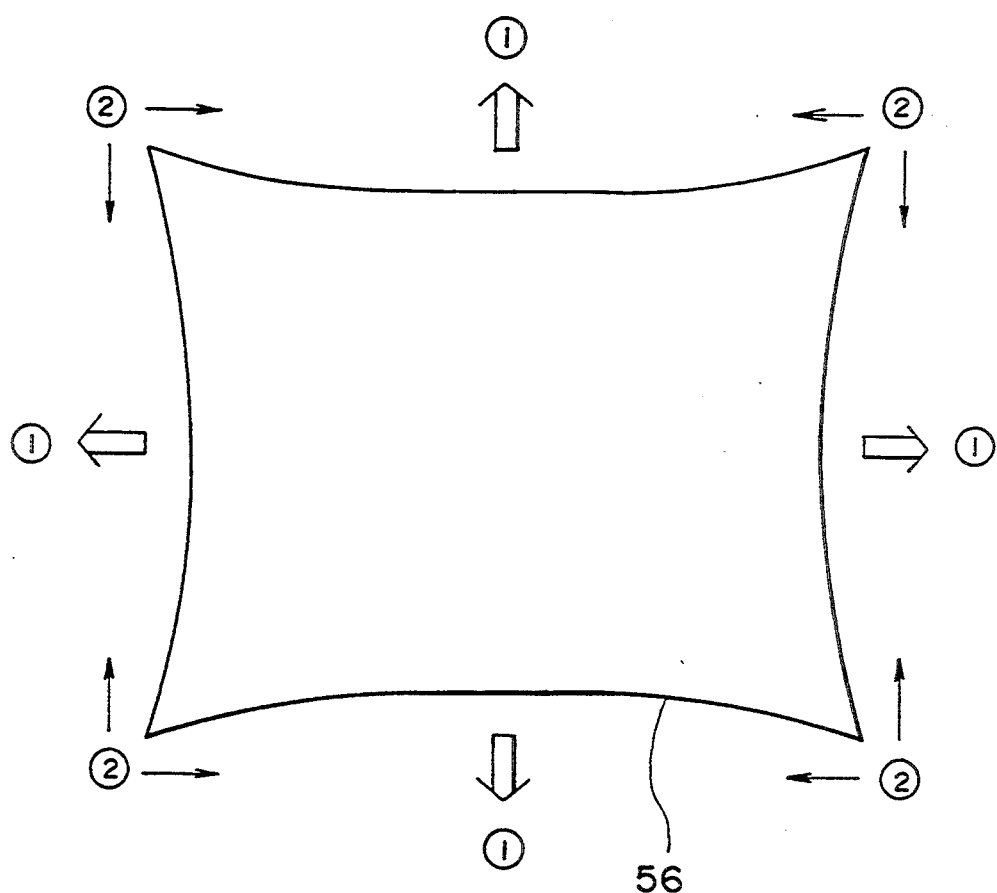
FIG. 39 is a schematic diagram describing the directions of action in accordance with the present invention.
Figure 40:
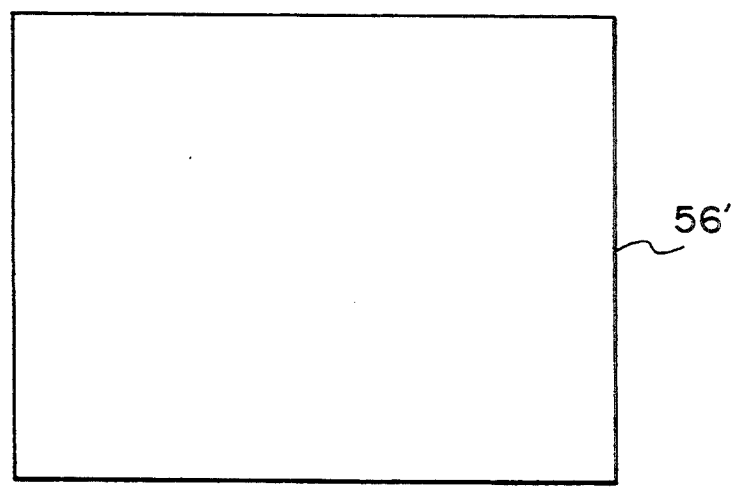
FIG. 40 is a schematic diagram describing an image formed on a screen in accordance with the present invention.

As shown in FIG. 39, with respect to a distortion (see FIG. 43) of an image 56 on a screen 7 in the case where a reflection mirror (the general reference numeral of all reflection mirrors is represented with 40a) is plane, provided that the compensation of distortion in the direction (1) is required, when a part of the reflection mirror 40a is formed in a convex surface shape, an image 56' without a distortion shown in FIG. 40 can be formed on the screen 7. On the other hand, provided that the compensation of distortion in the direction (2) is required, when a part of the reflection mirror 40a is formed with a concave surface shape as shown in FIG. 38 (b), an image 56' without distortion can be formed on the screen 7 as shown in FIG. 40.

In other words, with respect to a portion of the reflection mirror 40a where the size of the image 56 should be enlarged, the portion is formed in a convex surface shape as shown in FIG. 38 (a). On the other hand, with respect to a portion of the reflection mirror 40a where the size of the image 56 should be reduced, the portion is formed in a concave surface shape as shown in FIG. 38 (b).

In the projection type displaying apparatus described in the above mentioned embodiment, provided that the image 56 on the screen 7 does not have a required magnification and thereby the image 56 is smaller than the screen, when the entire surface of the reflection mirror 40a is formed in a cylindrical shape with a convex surface as shown in FIG. 38 (a), the image 56' without distortion can be formed on the screen 7 as shown in FIG. 40. On the other hand, provided that the image is larger than the screen 7, when the entire surface of the reflection mirror 40a is formed in a cylindrical shape with a concave surface as shown in FIG. 38 (b), an image 56' without distortion can be formed on the screen 7 as shown in FIG. 40.

The construction of the above-mentioned reflection mirror can be applied to at least one of the plurality of reflection mirrors 40a to 42a in the above-mentioned optical system.

As described above, according to this embodiment, in the projection type displaying apparatus using the oblique projection optical system, even if a distortion of an image takes place due to the projection lens and reflection mirrors or even if a required magnification cannot be obtained, such problems can be solved with at least one reflection mirror. In this case, although the projection distance partially varies, since the depth of focus is large, the amount of out-of-focus does not lead to a practical problem.

Next, a screen will be described.

Figure 45:
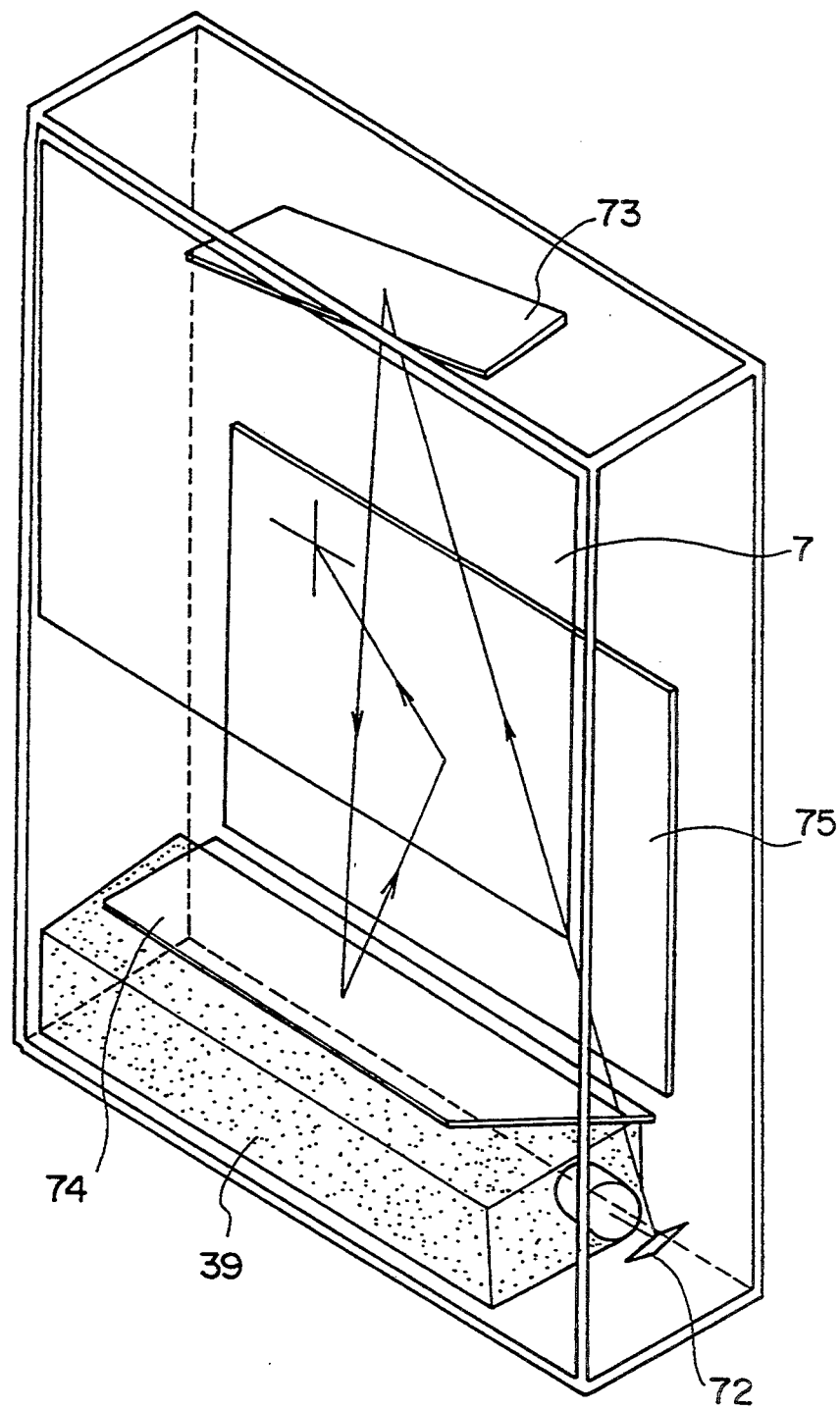
FIG. 45 is a perspective view showing a rear projection type projector using the embodiment of the transmitting type screen.

FIG. 45 is a perspective view showing an embodiment of a transmitting type screen for use in the rear projection type projector in accordance with the present invention.

Figure 44:
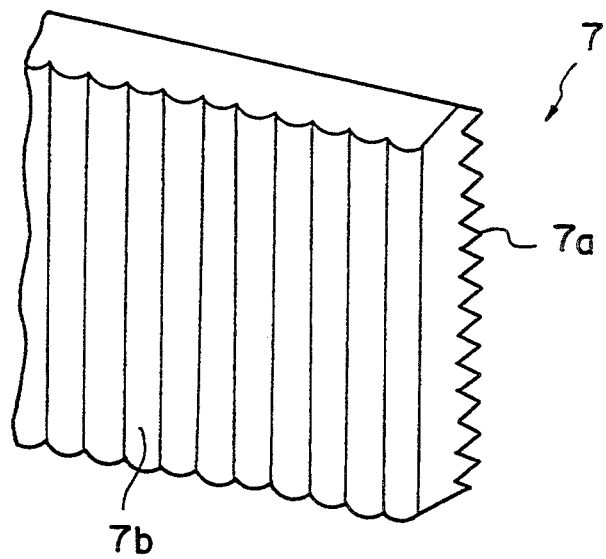
FIGS. 44 (A) and (B) are a perspective view and a sectional view showing a part of the construction of a transmitting type screen in accordance with the present invention, respectively.
Figure 44B:
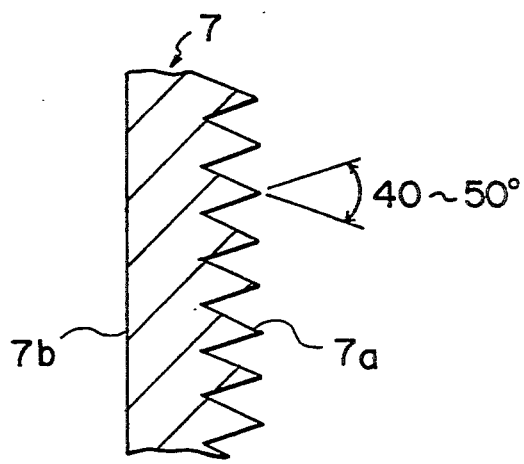

Rays of light which are radiated from a projection optical unit 39 are reflected by reflection mirrors 72, 73, 74, and 75 and thereby the optical path thereof is accordingly changed. The resultant rays of light are projected on the rear surface of a transmitting type screen 7. The transmitting type screen 7 is formed of polycarbonate (PC) or polymethyl methacrylate (PMMA). FIGS. 44 (a) and (b) are a perspective view and a partial enlarged sectional view of the transmitting type screen 7, respectively. On the light incident surface of the screen 7, a fine prism array 7a is formed. On the light exit surface, a lenticular 7b is formed. The cross section of the fine prism array 7a is formed in a saw tooth shape. The vertical angle of each prism is set to an angle in the range from 40° to 50°.

In the transmitting type screen 7 of this embodiment, since the vertical angle of each prism is smaller than that of a conventional apparatus, the amount of light which leaks out of the prism array 7a is decreased. Thus, the loss of light being entered is decreased. As a result, as opposed to the conventional apparatus, a light leakage and a ghost do not take place. The fact that the transmitting type screen 7 in accordance with this embodiment can effectively suppress the occurrences of a light leakage and a ghost was confirmed by the following analysis. Next, the results of the analysis will be described with reference to FIGS. 46 to 48.

Figure 46:
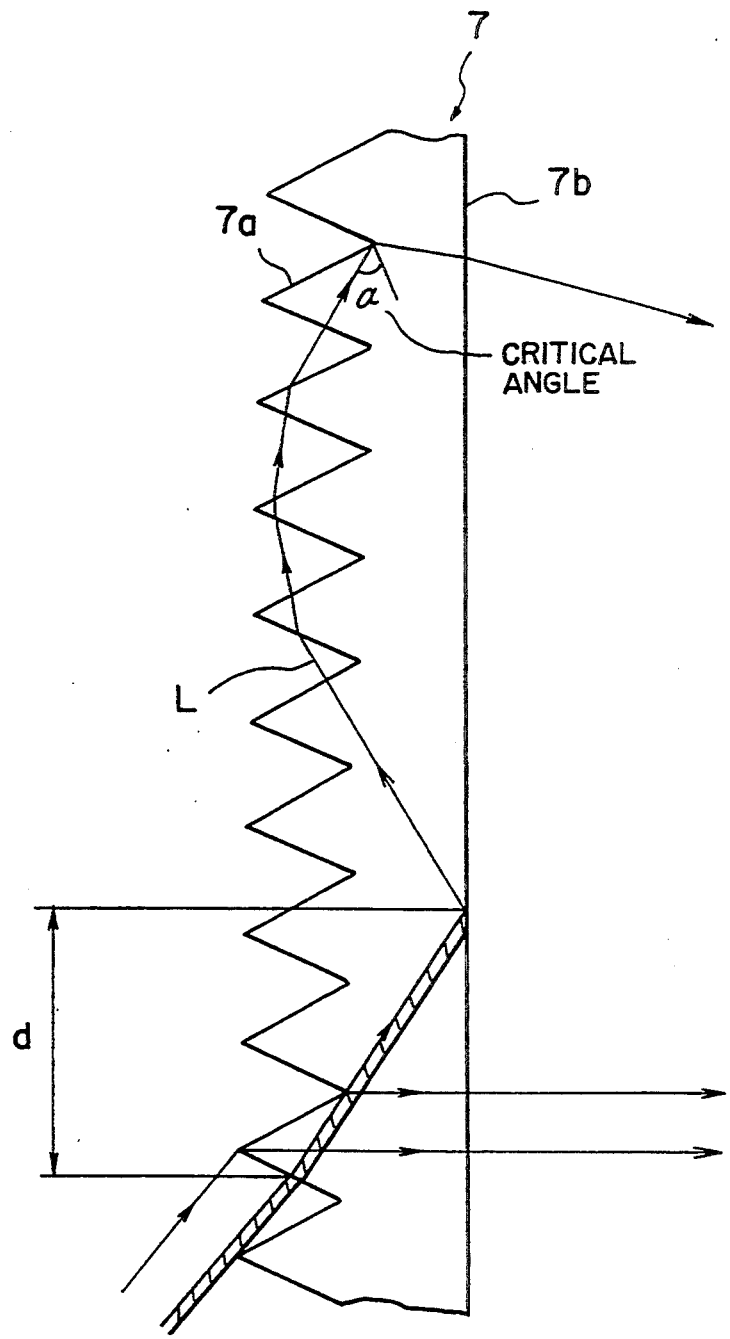
FIG. 46 is a sectional view showing a screen which was used for analyzing the validity of the embodiment of the transmitting type screen.

FIG. 46 is an enlarged sectional view showing a part of a transmitting type screen used in the analysis. This transmitting type screen is used for the above-mentioned rear projection type projector. In the figure, the same portions as FIG. 44 are represented with the same reference numerals. In FIG. 46, rays of light which are radiated from a projection optical unit 39 and then reflected by a mirror 75 is refracted by a prism array 7a. The resultant rays of light leave a lenticular 7b. Rays of light which are reflected by a mirror 75 partially leak out of the prism array 7a. The leaked rays of light are totally reflected on a light exit surface 7b. The resultant rays of light pass through three or four prisms. When the resultant rays of light enter a prism at an incident angle which exceeds a critical angle α, these rays of light are totally reflected in this prism and then leave the lenticular 7b. The resultant rays of light reach the observer side.

Figure 47:
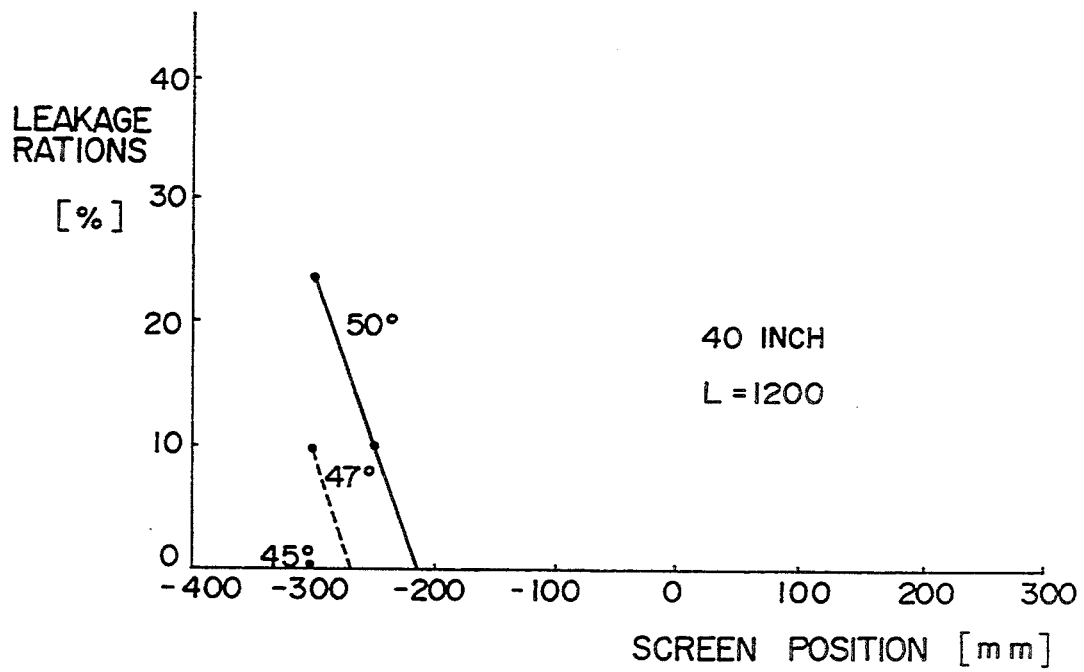
FIG. 47 is a chart showing light leakage ratios according to the screen positions of a 40-inch screen as the transmitting type screen of FIG. 46.
Figure 48:
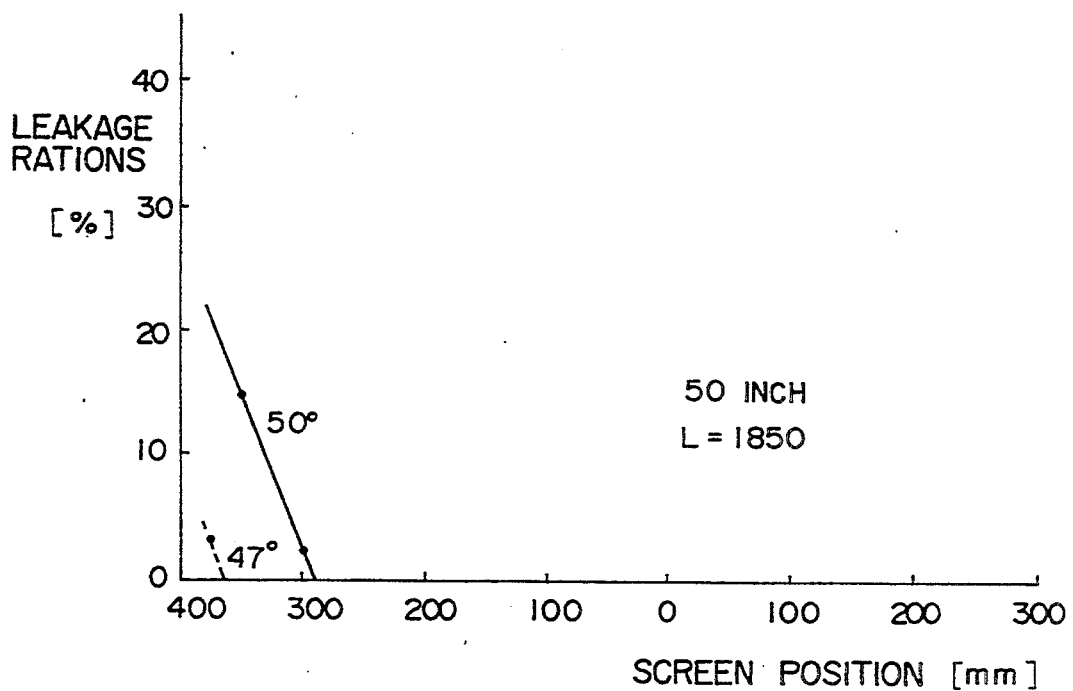
FIG. 48 is a chart showing light leakage ratios according to the screen positions of a 50-inch screen as the transmitting type screen of FIG. 46.

The results of calculations of light leakage ratios at various points on the screen 7 are shown in charts of FIGS. 47 and 48. The horizontal axis of each chart represents the screen position [mm]. Position 0 represents the center position in the vertical direction of a Fresnel lens 7a. Other values represent the distances of vertical positions apart from the center position. The vertical axis of each chart represents light leakage ratios [%] which denote the percent of rays of light reflected by the mirror 75 leaking out. In each chart, plots with solid lines represent the analytic results in the case where the vertical angle of each prism of the prism array is 50°. On the other hand, plots with dash lines represent the analytic results in the case where the vertical angle of each prism of the prism array is 47°. Further, simple plots represent the analytic results in the case where the vertical angle of each prism of the prism array is 45°. The light incident angle of each chart, namely, the angle of rays of light inclined in the normal direction on the screen surface is 60°.

FIG. 47 shows the results of calculations in the case where the size of the transmitting type screen 7 is 40 inches and the projection length L is 1200 mm. On the other hand, FIG. 48 shows the results of calculations in the case where the size of the transmitting type screen 7 is 50 inches and the projection length L is 1850 mm. As shown in the charts, as the vertical angle of each prism decreases, the light leakage ratio decreases. Thus, in the case of the 40 inch screen shown in FIG. 47, when the vertical angle of each prism is 50°, light leakage starts at the position approximately 210 mm below the center position of the screen. As rays of light are apart from the center of the screen, the light leakage ratio increases. When the rays of light are present at the edge of the screen, namely at the position 300 mm below the center position of the screen, the light leakage ratio becomes approximately 24%. On the other hand, when the vertical angle of each prism is 47°, the light leakage starts at the position approximately 270 mm below the center position of the screen. The light leakage ratio at the edge of the screen, namely at the position 300 mm below the center position of the screen, becomes approximately 10%. When the vertical angle of each prism is 45°, the light leakage slightly takes place only at the edge of the screen, namely, at the position 300 mm below the center position of the screen. In the case of the 40 inch screen, the vertical length of the screen 7 is 600 mm. Thus, it is possible to measure the light leakage ratios in the area 300 mm apart from the center position of the screen in each direction. In addition, as shown in FIG. 45, the lower the position on the screen, the smaller the light incident angle. Thus, as shown in the above-mentioned analytic results, the more rays of light are apart from the center position of the screen, the more the light leakage ratio increases. Thus, the light leakage ratios can be sufficiently measured at positions below the center position of the screen.

Thus, in the case of the 50 inch screen as shown in FIG. 48, since the vertical length of the screen 7 is 750 mm, it is possible to measure the light leakage ratios in the area from the center position of the screen to the position 375 mm below the center position of the screen. In this case, when the vertical angle of each prism is 50°, the light leakage starts at the position approximately 290 mm below the center position of the screen. The light leakage ratio at the edge of the screen, namely at the position 375 mm below the center position of the screen becomes approximately 22%. When the vertical angle of each prism is 47°, the light leakage starts at the position approximately 360 mm below the center position of the screen. The light leakage ratio at the edge of the screen, namely at the position 375 mm below the center position of the screen becomes approximately 5%. When the vertical angle of each prism is 45°, no light leakage takes place.

As described above, as the vertical angle of each prism decreases from 50°, the light leakage ratio gradually decreases. When the vertical angle of the prism is as small as 45°, the light leakage almost does not take place on the 40-inch and 50-inch screens. When the vertical angle of each prism is 50°, the light leakage ratio at the edge of the 40 inch screen becomes 24%. It is likely that such a light leakage ratio is not a problem to consider. However, when the vertical angle of each prism becomes small, each vertical angle portion tends to be broken. In addition, the casting property in the resin casting stage is liable to be degraded. Thus, it is preferable that the vertical angle of the prism be at least 40°. As a result, when the vertical angle of each prism of the prism array 7a is formed at an angle in the range from 40° to 50°, the light leakage and ghosts can be effectively prevented.

Figure 49:
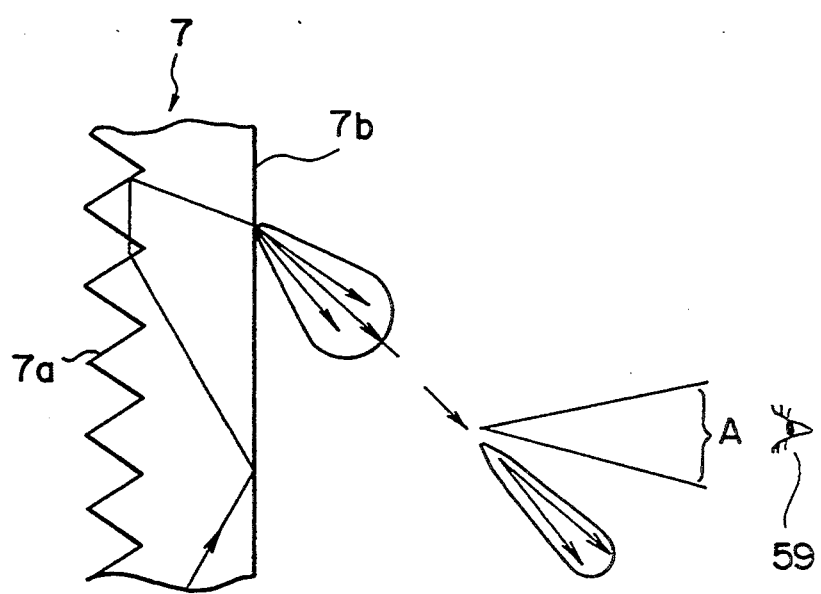
FIG. 49 is a schematic diagram describing how a light source having a high directivity can prevent a ghost from taking place.

In the light source of the projection optical unit 39 of the present embodiment, a xenon lamp which has a high directivity is used. Thus, as shown in FIG. 49, when the optical paths of rays of light which leak out are deflected from the field of view A of eyes 59 of the user, he does not visibly recognize ghost images.

As described above, according to this embodiment, since the vertical angle of each prism of the fine prism array is set to a small angle in the range from 40 to 50 degrees, the amount of light which leaks out of the prism array decreases thereby reducing the loss of the entering light. As a result, with the transmitting type screen, since a ghost and light leakage do not take place, an image with a high brightness and a high quality can be obtained.

Figure 52:
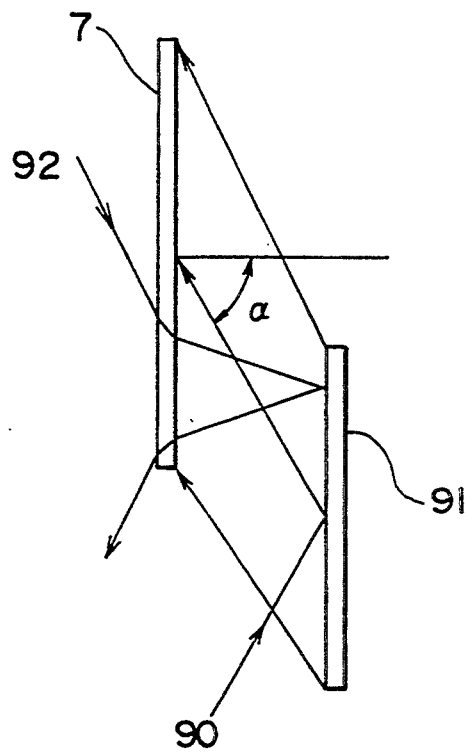
FIG. 52 is a sectional view showing a last reflection mirror of a related art.

On the other hand, in the conventional rear projection type displaying apparatus using such a type of a light bulb, rays of light strike into the surface of a screen 7 at an incident angle α as shown in FIG. 52. In this construction, the incident angle α is 60° or less. A last reflection mirror 91 which reflects projection rays of light 90 to the screen 7 is disposed parallel therewith.

Figure 53:
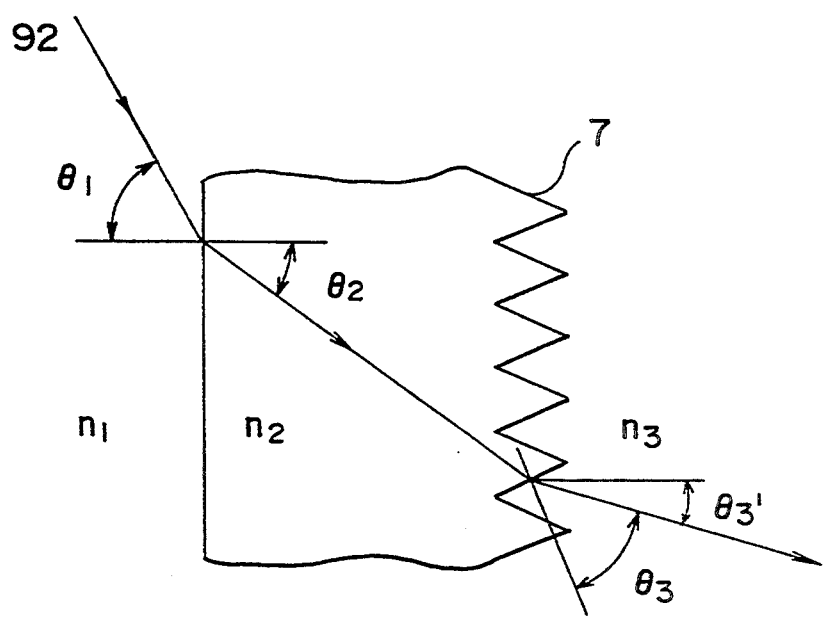
FIG. 53 is a schematic diagram showing how outer light is transmitted through a screen.

However, in the conventional display type rear projection displaying apparatus, since the incident angle α to the screen 7 is 60° or less, the screen 7 is partially overlapped with the reflection mirror 91 in the vertical direction. When outer rays of light 92 are entered at an incident angle θ1 (for example, 60°) as shown in FIG. 53, the rays of light pass through the screen 7 at an exit angle θ3' (for example, approximately, 15.43°). The resultant rays of light are reflected by the reflection mirror 91 and then strike the screen 7 at an incident angle θ3' (for example, approximately 15.43°). The resultant rays of light pass through the screen 7 at an exit angle θ1 (for example, 60°). Thus, as shown in FIG. 55, the hatched portion of the screen 7 lights in white, thereby deteriorating the contrast of the screen 7.

To solve this problem, when the incident angle α to the screen 7 is set to 60° or more, the overlapped portion between the screen 7 and the last reflection mirror 91 can be shortened. Thus, as shown in FIG. 53, when the incident angle $\theta 1$ of the outer rays of light 92 is 60°, the exit angle $\theta 3'$ becomes approximately 15.43°. Therefore, even if the rays of light 92 pass through the screen 7 and then reflected by the reflection mirror 91, the rays of light do not enter the screen 7.

Consequently, according to the above-mentioned embodiment, in the projection type displaying apparatus using the oblique projection optical system, since the whitish-lighting portion due to outer rays of light is reduced on the screen, the deterioration of the contrast of the screen can be prevented. As a result, an image with a high contrast can be obtained.

Industrial Utilization

The present invention can be applied to a projection type displaying apparatus in particular a cabinet type displaying apparatus so as to provide a screen with an even brightness and free from image distortion and light leakage.

We claim:

1. A projection type displaying apparatus, comprising:
    a light source;
    optical modulating means;
    projecting means for projecting an image generated by said optical modulating means on a screen; and
    said screen;
    wherein a center optical axis of rays of light projected by said projecting means are obliquely entered into said screen;
    wherein said projecting means comprises:
        first projecting optical means for converting an image generated by said optical modulating means into an intermediate image with trapezoidal distortion; and
        second projecting optical means for converting said intermediate image with trapezoidal distortion into an image without trapezoidal distortion on said screen; and
        wherein said first projecting optical means comprises two lenses which are not parallel to each other.

2. The projection type displaying apparatus as set forth in claim 1, wherein said two lenses which are not parallel to each other of said first projecting optical means are disposed in such a way that a line of intersection of a screen side focal plane of a light source side lens and a light Source side focal plane of a screen side lens passes through a line which connects a principal point of the light source side lens and a principal point of the screen side lens.

3. The projection type displaying apparatus as set forth in claim 1, wherein said first projecting optical means comprises at least two sets of two lenses which are not parallel to each other.

4. A projection type displaying apparatus, comprising:
    a light source;
    optical modulating means;
    projecting means for projecting an image generated by said optical modulating means on a screen; and
    said screen;
    wherein a center optical axis of rays of light projected by said projecting means are obliquely entered into said screen;
    wherein said projecting means comprises:
        first projecting optical means for converting an image generated by said optical modulating means into an intermediate image with trapezoidal distortion;
        second projecting optical means for converting said intermediate image with trapezoidal distortion into an image without trapezoidal distortion on said screen; and
        an aperture stop mechanism for performing an optical adjustment, that is, for improving the quality of an image; and
        wherein said first projecting optical means comprises at least one set of two lenses which are not parallel to each other, said aperture stop mechanism being disposed in projecting optical means.

5. The projection type displaying apparatus as set forth in claim 4, wherein said aperture stop mechanism is disposed in the vicinity of a point of intersection where a line of intersection of focal planes of said two lenses which are not parallel to each other intersects a line which connects principal points of said two lenses.

6. The projection type displaying apparatus as set forth in claim 4, wherein said aperture stop mechanism is in a flat shape.

7. The projection type displaying apparatus as set forth in claim 1, wherein said light source comprises a lamp and a reflector, and a light transmitting optical device adapted for equalizing a distribution of rays of light reflected by said reflector, said light transmitting optical device being disposed on a light exit side of said reflector.

8. A projection type displaying apparatus, comprising:
    optical modulating means;
    projecting means for projecting an image generated by said optical modulating means on a screen;
    a reflection mirror for reflecting rays of light projected by said projecting means to said screen;
    wherein said reflecting mirror includes a plurality of successive elements in the path of the rays of light, the last of said elements of said reflection mirror being disposed parallel to said screen; and
    wherein a center optical axis of the rays of light projected by said projecting means has an incident angle α to said screen, the incident angle α being 60° or more.

9. An illumination system having a lighting unit, said lighting unit comprising a lamp, a reflector for reflecting, at an exit side of the reflector, a beam of light rays having a width greater than that of the reflector, and a light transmitting optical element arranged on the exit side of the reflector and having a face with a wall thickness which is gradually reduced at restricted sides of the beam, so that the light rays of the beam reflected by the reflector have a substantially even distribution.

10. An illumination system comprising a lamp, a reflector and a light transmitting optical device disposed on an exit side of the reflector, said optical device having a conical surface to produce a distribution of light rays in a beam reflected by the reflector which is substantially even.

11. The illumination system as set forth in claim 10, wherein said optical device comprises two right-circular conical members facing in opposite directions.

12. The illumination system as set forth in claim 10, wherein said optical device comprises a first right-circular conical member facing in one direction and a second member having a right-circular conical recess therein pointing in the same direction as said first conical member.

13. The illumination system as set forth in claim 10, wherein said optical device comprises a body having end faces of right circular conical shape facing in opposite directions.

14. The illumination system as set forth in claim 10, wherein said optical device comprises a body having end surfaces one of which is of right-circular conical shape pointed in one direction and the other of which has a right-circular conical recess also pointed in said one direction.

15. The illumination system as set forth in claim 10, wherein said optical device comprises a first element having end surfaces one of which is of right-circular conical shape pointed in one direction and the other of which is a right-circular conical recess also pointed in said one direction, and a second element having a right-circular conical surface pointed in said one direction.

16. An illumination system comprising a lamp, a reflector, and a light transmitting optical element disposed at an exit side of the reflector for displacing rays of light reflected by the reflector at sides thereof towards a central part of the rays of light, and for displacing rays of light at said central part towards said sides.

17. An illumination system as set forth in claim 16, wherein said optical element is conical.

18. An illumination system as set forth in claim 17, wherein said optical element comprises two convex optical members.

19. An illumination system as set forth in claim 17, wherein said optical element comprises an optical member having opposite faces of convex shape.

20. An illumination system as set forth in claim 17, wherein said optical element comprises two optical members, one of which has one face of convex shape and an opposite face of concave shape, and the other of which elements is convex.

21. An illumination system comprising a lamp, a reflector, and a plurality of light transmitting optical elements disposed on an exit side of the reflector for condensing rays of light reflected by the reflector, one of said light transmitting optical elements including two conical optical members, a first of which is convex, and a second of which is concave.

22. An illumination system comprising a lamp, a reflector, and a light transmitting optical element disposed on an exit side of said reflector for condensing rays of light reflected by the reflector, said optical element comprising a conical member having one face of convex shape and an opposite face of concave shape.

* * * * *